(12) United States Patent
Sklar

(10) Patent No.: US 11,345,457 B2
(45) Date of Patent: May 31, 2022

(54) HYBRID BODY FUSELAGE

(71) Applicant: Andrew W. Sklar, New York, NY (US)

(72) Inventor: Andrew W. Sklar, New York, NY (US)

( * ) Notice: Subject to any disclaimer, the term of this patent is extended or adjusted under 35 U.S.C. 154(b) by 178 days.

(21) Appl. No.: 16/788,636

(22) Filed: Feb. 12, 2020

(65) Prior Publication Data

US 2021/0031899 A1 Feb. 4, 2021

Related U.S. Application Data

(60) Provisional application No. 62/879,595, filed on Jul. 29, 2019.

(51) Int. Cl.
| | |
|---|---|
| *B64C 30/00* | (2006.01) |
| *B64C 39/04* | (2006.01) |
| *B64C 1/00* | (2006.01) |
| *B64C 1/06* | (2006.01) |

(52) U.S. Cl.
CPC .............. *B64C 1/069* (2013.01); *B64C 1/061* (2013.01); *B64C 30/00* (2013.01); *B64C 39/04* (2013.01); *B64C 2001/0045* (2013.01)

(58) Field of Classification Search
CPC ............ B64C 30/00; B64C 2001/0045; B64C 1/0009; B64C 39/04; B64C 39/08; B64C 39/068; B64C 1/62; B64G 1/00; B64G 1/14
USPC ................................ 244/158.9, 159.1, 159.3
See application file for complete search history.

(56) References Cited

U.S. PATENT DOCUMENTS

| | | | |
|---|---|---|---|
| 3,737,121 A | 6/1973 | Jones | |
| 3,884,432 A | 5/1975 | Blanchard, Jr. et al. | |
| 4,170,110 A * | 10/1979 | Radin | ....................... F23R 3/28 60/768 |
| 4,582,276 A * | 4/1986 | Gerhardt | ................. B64C 30/00 244/119 |

(Continued)

FOREIGN PATENT DOCUMENTS

GB          679445 A       9/1952

OTHER PUBLICATIONS

W. H. Mason, Some Supersonic Aerodynamics, Spring 2018, Virginia Tech Department of Aerospace and Ocean Engineering, pp. 4, 10-14, and 18) (Year: 2018).*

(Continued)

*Primary Examiner* — Joshua J Michener
*Assistant Examiner* — Ryan Andrew Yankey
(74) *Attorney, Agent, or Firm* — Schmeiser, Olsen & Watts, LLP

(57) ABSTRACT

A supersonic aircraft fuselage includes a fuselage body having a first end, a second end, a length extending between the first end and second end, a surface, a first flat plane extending from the first end to a center of the fuselage body along the length on the surface, and a second flat plane extending from the second end to the center of the fuselage body along the length on the surface. The surface includes a curved portion conforming to a Sears-Haack body shape and abutting the first flat plane and second flat plane and extending between the first end and second end. A supersonic aircraft includes a first fuselage, a second fuselage, and a space between the first fuselage and second fuselage. The first fuselage and second fuselage form a Busemann biplane geometry within the space.

21 Claims, 15 Drawing Sheets

(56) References Cited

U.S. PATENT DOCUMENTS

| | | |
|---|---|---|
| 4,735,381 A | 4/1988 | Wood |
| 9,296,478 B2 | 3/2016 | Bender |
| 2006/0016931 A1 | 1/2006 | Malvestuto et al. |

OTHER PUBLICATIONS

Michael J. Waddington, "Development of an Interactive Wave Drag Capability for the OpenVSP Parametric Geometry Tool," Jul. 2015, CORE, pp. 60-61 (Year: 2015).*

Wataru Yamazaki and Kazuhiro Kusunose, "Innovative Supersonic Transport Configuration By Biplane Wing / Twin-Body Fuselage," Sep. 7-12, 2014, ICAS, Figures 3, 5, and 6; also pp. 4 and 5 (Year: 2014).*

* cited by examiner

HYBRID BODY FUSELAGE

CROSS REFERENCE TO RELATED APPLICATIONS

This application claims priority to U.S. Provisional Application No. 62/879,595, filed Jul. 29, 2019, the entirety of which is incorporated by reference.

TECHNICAL FIELD

Aircraft fuselages and more specifically, the geometric configuration of supersonic aircraft fuselages.

BACKGROUND

Use of supersonic flight presents the benefits of significantly decreasing flight times, and increasing the number of trips a single aircraft can take in a day, which also translate to economic benefits in the field of commercial flight. State of the art supersonic aircraft fuselages often use the Sears-Haack body shape as an accepted, optimal shape for the minimum wave drag of a given volume and length of a fuselage. The Sears-Haack body shape assumes a slender, axisymmetric body and has linearized supersonic flow. The Sears-Haack body shape minimizes supersonic wave drag of a single body in flight. Another configuration is the Busemann biplane, which places two triangular wedges a specific distance apart, and provides low supersonic wave drag with no sonic boom signature. A fuselage and supersonic aircraft using the benefits of the Sears-Haack body shape and the Busemann biplane design would be well received in the art.

SUMMARY

According to one aspect, a supersonic aircraft fuselage comprises a fuselage body including a first end; a second end; a length extending between the first end and second end; a surface; a first flat plane extending from the first end to a center of the fuselage body along the length on the surface; and a second flat plane extending from the second end to the center of the fuselage body along the length on the surface, wherein the surface includes a curved portion conforming to a Sears-Haack body shape and abutting the first flat plane and second flat plane and extending between the first end and second end.

According to another aspect, a supersonic aircraft fuselage comprises a fuselage body including: a first end; a second end; a length extending between the first end and second end; a surface; a first flat plane extending from the first end to a first plane end point on the first fuselage body on the surface located along the length; a second flat plane extending from the first plane end point to a second plane end point on the first fuselage body on the surface located along the length; a third flat plane extending from the second plane end point to the second end, wherein the surface includes a curved portion conforming to a Sears-Haack body and abutting the first flat plane, second flat plane, and third flat plane, and extending between the first end and second end.

According to another aspect, a supersonic aircraft comprises a first fuselage; a second fuselage; and a space between the first fuselage and second fuselage, wherein the first fuselage and second fuselage form a Busemann biplane geometry within the space.

According to another aspect, a method of making a supersonic aircraft comprises providing a first fuselage and a second fuselage; and connecting the first fuselage to the second fuselage such that a space is located between the first fuselage and second fuselage, wherein the first fuselage and second fuselage form a Busemann biplane geometry within the space.

DESCRIPTION

A detailed description of the hereinafter-described embodiments of the disclosed apparatus and method are presented herein by way of exemplification and not limitation with reference made to the Figures. Although certain embodiments are shown and described in detail, it should be understood that various changes and modifications might be made without departing from the scope of the appended claims. The scope of the present disclosure will in no way be limited to the number of constituting components, the materials thereof, the shapes thereof, colors thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

Figure 27:
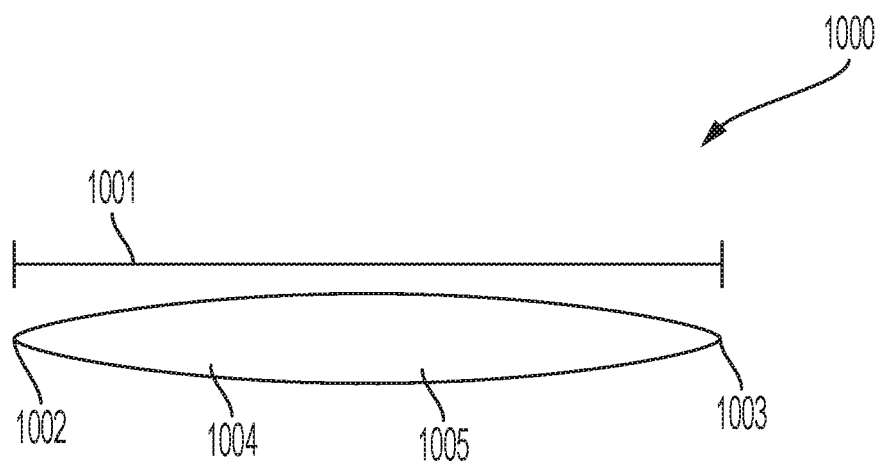
FIG. 27 depicts a top view of a state-of-the-art Sears-Haack body fuselage.

Beginning with FIG. 27, a top view of an embodiment of a state-of-the art Sears-Haack body shape fuselage 1000 is shown. The Sears-Haack body shape fuselage 1000 has a fuselage body 1001. The fuselage body 1001 has a circular cross section along a length 1002 that extends from a first end 1003 of the fuselage body 1001 to a second end 1004 of the fuselage body 1000. The circular cross section of the Sears-Haack body shape fuselage 1000 increases in circumference from the first end 1003 to a midpoint 1005 along the length 1002 of the fuselage body 1000, and increases in circumference from the second end 1004 to the midpoint 1005, such that the fuselage body 1001 of the Sears-Haack body shape fuselage 1000 has a cylinder shape that is tapered at each of the first end 1003 and second end 1004. The increase in circumference of the cross section of the fuselage body 1001 from the first end 1003 and second end 1004 to the midpoint 1005 is a smooth continuous increase. In application, the Sears-Haack body shape has a low wave drag because of its single smooth volume, smooth distribution of body area, and slender, axisymmetric fuselage body 1001. Further in application, the Sears-Haack body shape has a linearized supersonic flow.

Figure 28:
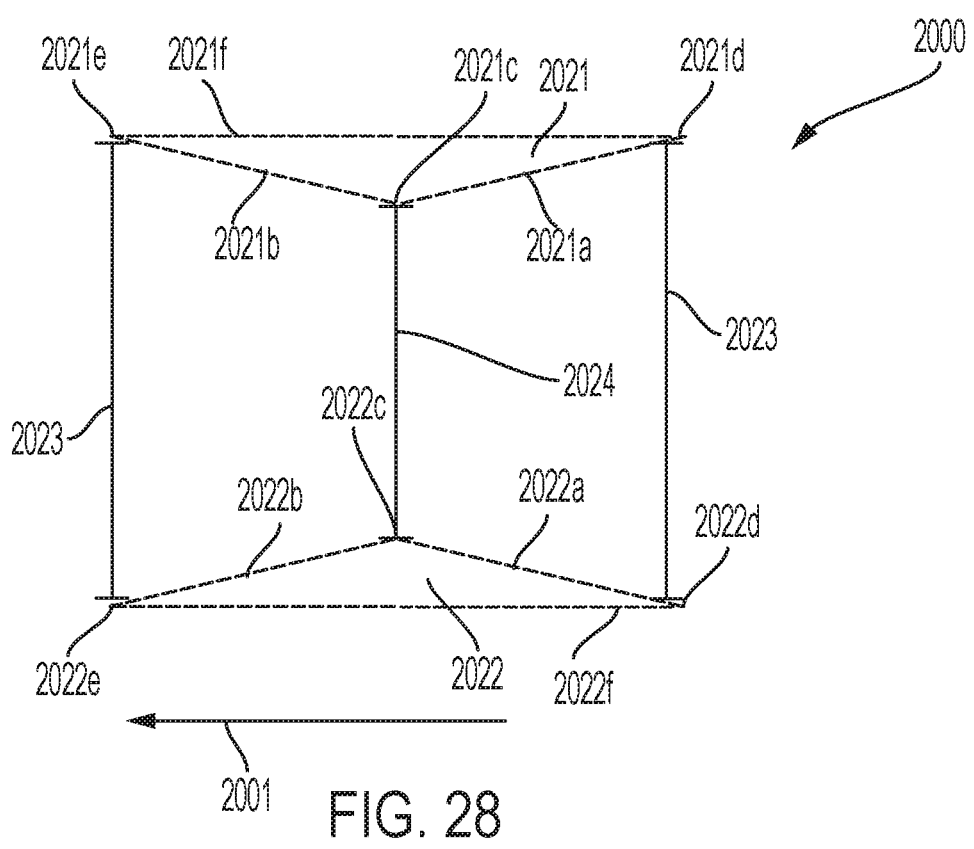
FIG. 28 depicts a side view of a state-of-the-art Busemann biplane geometry.

Referring now to FIG. 28, a side view of an embodiment of a state-of-the-art Busemann biplane geometry 2000 is shown. The Busemann biplane geometry 2000 includes a first triangular shape 2021 and a second triangular shape 2022. The first and second triangular shapes 2021 and 2022 are mirror images of each other. The first triangular shape 2021 has a first plane 2021a and a second plane 2021b, and the second triangular shape 2022 has a first plane 2022a and a second plane 2022b. The first plane 2021a and second plane 2021b have equal lengths, and the first plane 2022a and second plane 2022b have equal lengths. In application, the first and second planes 2021a, 2021b, 2022a, 2022b are flat surfaces. The first plane 2021a extends from a first vertex 2021d of the first triangular shape 2021 to a second vertex 2021c of the first triangular shape, and the second plane 2021b extends from a third vertex 2021e of the first triangular shape 2021 to the second vertex 2021c. Likewise, the first plane 2022a extends from a first vertex 2022d of the second triangular shape 2022 to a second vertex 2022c of the second triangular shape 2022 and the second plane 2022b extends from a third vertex 2022e of the second triangular shape 2022 to the second vertex 2022c. A third plane 2021f of the first triangular shape 2021 extends from the first vertex 2021d to the third vertex 2021e. A third plane 2022f of the second triangular shape 2022 extends from the first vertex 2022d to the third vertex 21e. The third planes 2021f and 2022f are equal in length.

In the Busemann biplane geometry 2000, the first triangular shape 2021 and the second triangular shape 2022 are spaced apart from one another and arranged such that the second vertices 2021c, 2022c face one another and are aligned with one another, and such that there is distance 2023 between the third vertices 2021e, 2022e and between the second vertices 2021d, 2022d, and a second distance 2024 between the second vertices 2021c, 2022c. In application of the Busemann biplane geometry 2000, the third plane 2021f may be referred to as an upper plane and the third plane 2022f may be referred to as a bottom plane, and the first triangular shape 2021 and second triangular shape 2022 may represent cross sections of two components of an aircraft, for example, stacked wings. The third vertices 2021e, 2022e may be arranged as leading edges of aircraft components such as stacked wings, such that a chord of each wing extends along the third planes 2021f, 2022f and the first vertices 2021d, 2022d may be arranged as trailing edges of aircraft components such as stacked wings. In this embodiment, the chord of each wing is parallel to the direction of the aircraft's velocity, for example, in direction 2001.

A space between the first triangular shape 2021 and second triangular shape 2022 from the second vertices 2021, 2022c, to the first vertices 2021d, 2022d may be referred to as a diverging section. Further in application, shock waves generated are reflected between the first triangular shape 2021 and second triangular shape 2022 and are eventually cancelled out by an expansion fan from the diverging section. Further, pressure exerted on the first and second planes 2021a, 2021b, 2022a, 2022b in the Busemann biplane geometry 2000 is kept nearly constant for a majority of the distance along the chords (e.g. third planes 2021f, 2022f) and drops to freestream pressure near the trailing edges. This minimal pressure difference reduces wave drag. In an ideal configuration of the Busemann biplane geometry 2020, the expansion fan and reflected shock wave cancel out at the trailing edge and no shock wave propagates out to the ground.

Embodiments of Busemann-Sears-Haack hybrid body fuselages enable shock wave interactions and cancellations and other benefits of Busemann biplane geometries to be applied to a supersonic aircraft fuselage having at least a partial Sears-Haack body shape, and multi-fuselage supersonic aircraft having fuselages with at least a partial Sears-Haack body shape.

Figure 1:
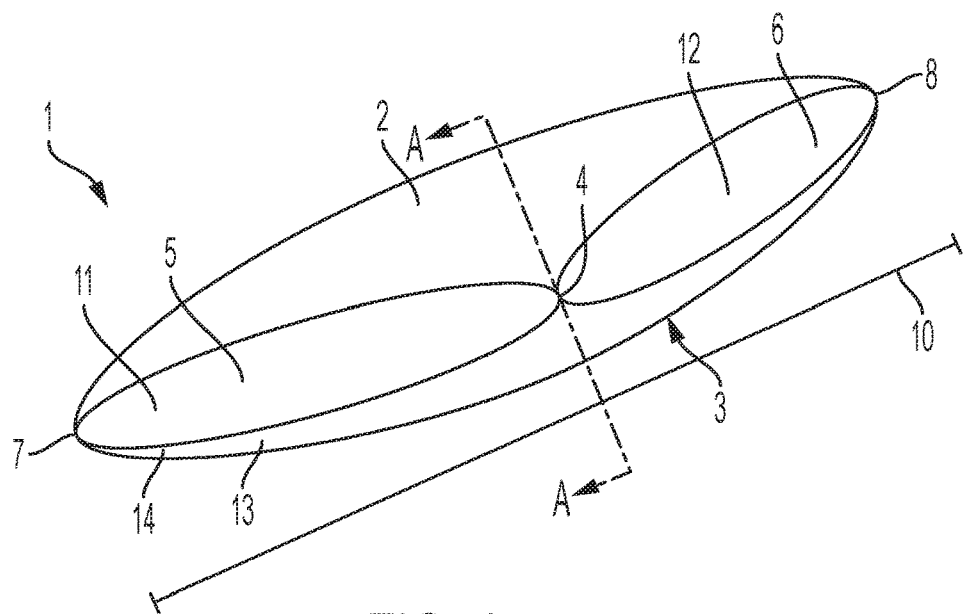
FIG. 1 depicts a perspective view of a Busemann-Sears-Haack hybrid body fuselage according to one embodiment.

Referring now to FIG. 1, a perspective view of a fuselage 1 having a Busemann-Sears-Haack hybrid body is shown according to one embodiment. The fuselage 1 has a fuselage body 2, and an entire length 10 that extends from a first end 7 of the fuselage 1 to a second end 8 of the fuselage 1. The fuselage 1 may be referred to as a Busemann-Sears-Haack hybrid body fuselage. The configuration of the fuselage 1 can be conceptualized as a Sears-Haack body shape, such as the Sears-Haack body shape 1000 of FIG. 27, in which two cuts have been made. For example, with respect to the fuselage 1, one straight cut extends from a center point 4 on a surface 3 of the fuselage 1 at a center of the length 10 to the first end 7 of the fuselage 1, and another straight cut extends from the center point 4 to the second end 8 of the fuselage 1. These two cuts form a first plane 5 and a second plane 6. In this embodiment the first plane 5 and second plane 6 are symmetrical. The first plane 5 and second plane 6 are configured such that an imaginary straight line (not shown) drawn across the first and second planes 5, 6 from the first end 7 to the second end 8 intersects the center point 4 and the first and second planes 5, 6 are symmetrical on either side of the imaginary straight line. The first and second planes 5, 6 are each flat planes. The first plane 5 has a first surface area 11. The second plane 6 has a second surface area 12. In this embodiment, the first and second surface areas 11, 12 are equal. The fuselage 1 has an entire surface area 13 defining the surface 3 of the fuselage 1. The entire surface area 13 includes the first surface area 11 of the first plane 5 and the second surface area 12 of the second plane 6. The entire surface area 13 includes a curved surface 14 that defines a portion of the entire area 13 that is not defined by the first and second surface areas 11, 12 of the first and second planes 5, 6. The curved surface 14 abuts the first and second planes 5, 6. The curved surface 14 conforms to a Sears-Haack body shape.

A cross section of the first fuselage 1 taken at the center 4 of the fuselage body 1 along the length along line A-A is a circle. A cross section of the fuselage body 2 taken at any point along the entire length 10 other than at the center point 4 will include a chord (a straight line) formed by the first or second plane 5, 6, and a curve formed by the curved surface 14 that begins at one end of the chord and ends at the other end of the chord.

Figure 2:
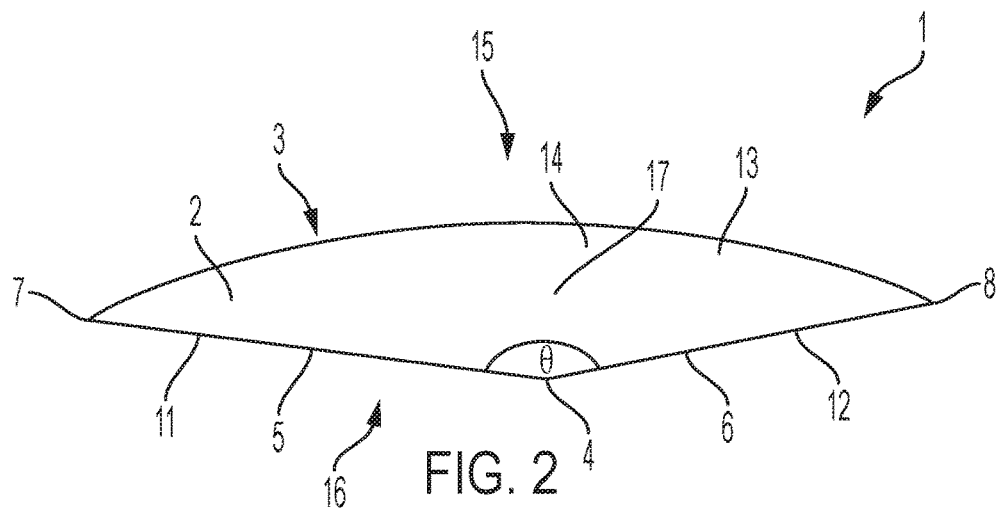
FIG. 2 depicts a top view of the Busemann-Sears-Haack hybrid body fuselage of FIG. 1 according to one embodiment.
Figure 3:
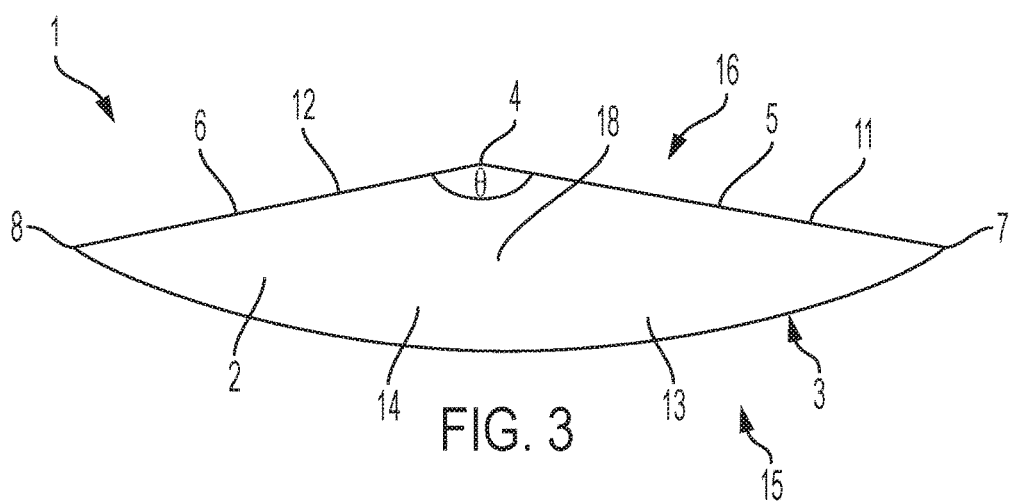
FIG. 3 depicts a bottom view of the Busemann-Sears-Haack hybrid body fuselage of FIGS. 1-2 according to one embodiment.

With reference to FIG. 2, a top view of the fuselage 1 of FIG. 1 is shown according to one embodiment. The fuselage 1 has a first side 15, a second side 16, and a top 17. The first side 15 has a continuous curved shape formed by the curved surface 14 extending from the first end 7 to the second end 8. The second side 16 includes the first and second flat planes 5, 6. At the center point 4, the first and second planes 5, 6 meet and form an obtuse angle θ. With reference to FIG. 3, a bottom view of the fuselage of FIGS. 1-2 is shown according to one embodiment. The fuselage 1 has a bottom 18. In this embodiment the bottom 18 is a mirror image of the top 17.

Figure 4:
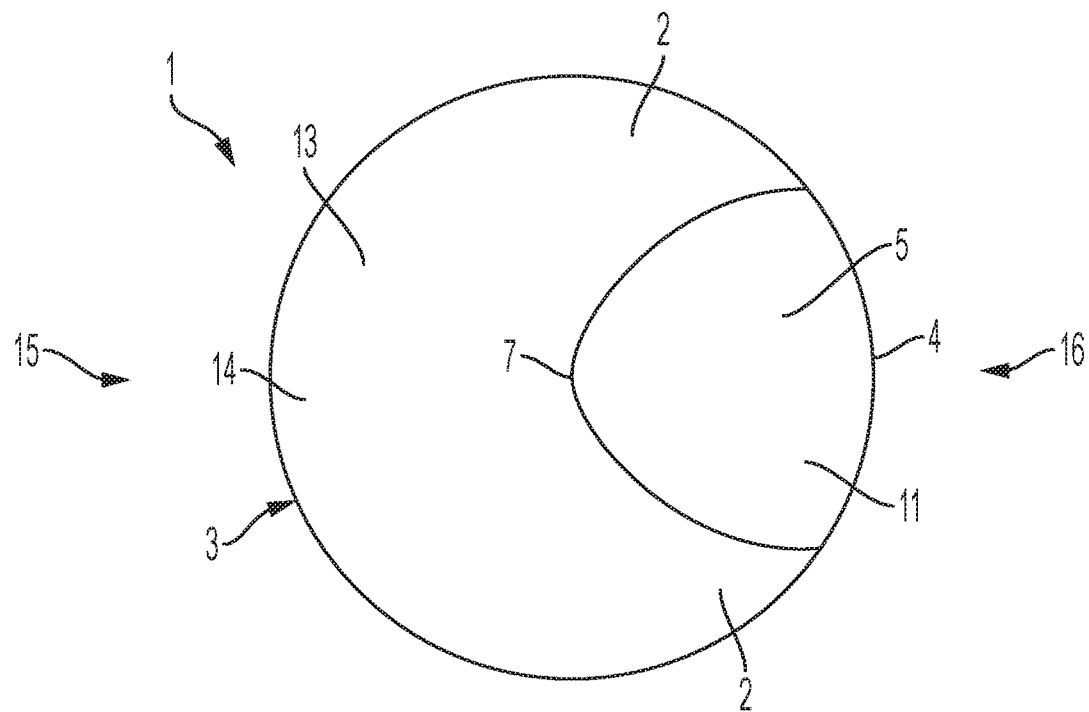
FIG. 4 depicts a front view of the Busemann-Sears-Haack hybrid body fuselage of FIGS. 1-3 according to one embodiment.
Figure 5:
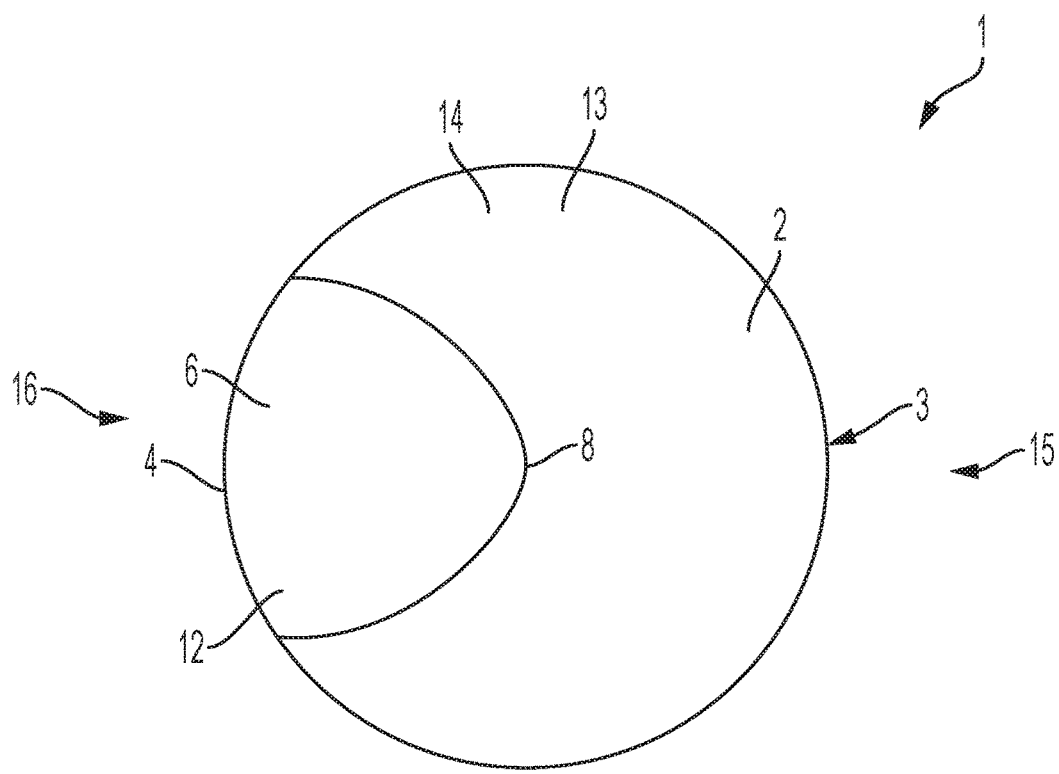
FIG. 5 depicts a back view of the Busemann-Sears-Haack hybrid body fuselage of FIGS. 1-4 according to one embodiment.

With reference to FIG. 4, a front view of the Busemann-Sears-Haack hybrid body fuselage of FIGS. 1-3 is shown according to one embodiment. The first end 7 may be referred to as a leading edge of the fuselage body 2. In this embodiment the fuselage 1 is configured such that the first end 7 is aligned with a center of a circumference of the curved surface 14 at a cross-section taken at the center point 4. With respect to FIG. 5, a back view of the Busemann-Sears-Haack hybrid body fuselage of FIGS. 1-4 is shown according to one embodiment. The second end 8 may be referred to as a trailing edge of the fuselage body 2. In this embodiment the fuselage 1 is configured such that second end 8 is aligned with the center of the circumference of the curved surface 14 at a cross section taken at the center point 4.

Figure 6:
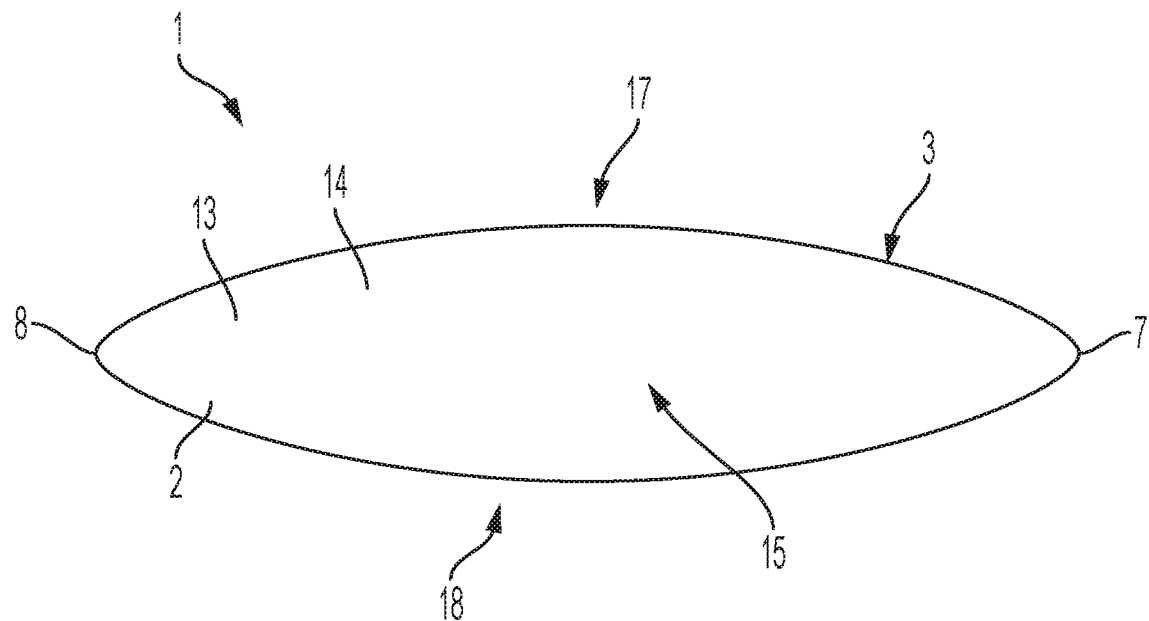
FIG. 6 depicts a first side view of the Busemann-Sears-Haack hybrid body fuselage of FIGS. 1-5 according to one embodiment.
Figure 7:
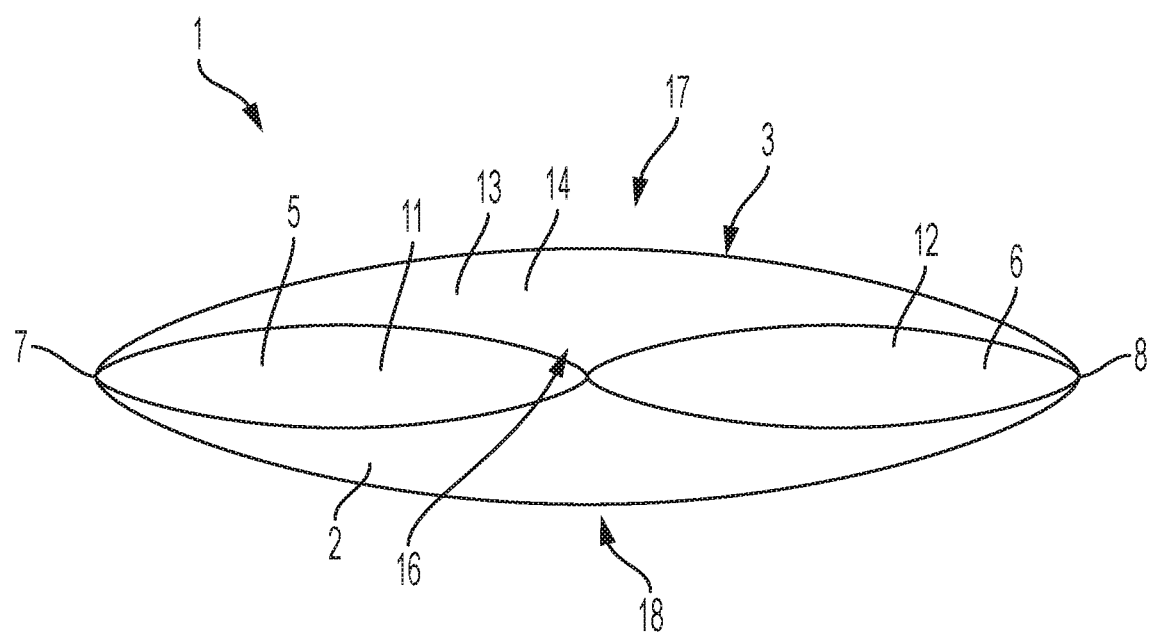
FIG. 7 depicts a second side view of the Busemann-Sears-Haack hybrid body fuselage of FIGS. 1-6 according to one embodiment.

Referring now to FIG. 6, a first side view of the Busemann-Sears-Haack hybrid body fuselage of FIGS. 1-5 is shown according to one embodiment. The first side 15 is shown. The curved surface 14 of the first side 15 is continuous from the first end 7 to the second end 18. In one embodiment, the first side 15 may be referred to as the outer side of the fuselage 1. The term "outer" refers to the position of the fuselage 1 in relation to a space between two Busemann-Sears-Haack fuselages 1 (shown in FIG. 16 and described hereinafter). With reference to FIG. 7, a second side view of the Busemann-Sears-Haack hybrid body fuselage 1 of FIGS. 1-6 is shown according to one embodiment. The second side 16 is shown. The first and second planes 5, 6 are located on the second side 16. The second side 16 may be referred to as the inner side of the fuselage 1. The term "inner" refers to the position of the fuselage 1 in relation to a second Busemann-Sears-Haack hybrid fuselage 1 when two Busemann-Sears-Haack body fuselages 1 are arranged to form a Busemann biplane geometry within a space between the two Busemann-Sears-Haack hybrid fuselages 1. The inner side 16 faces a second Busemann-Sears-Haack fuselage in a twin fuselage supersonic aircraft (shown in FIG. 16 and described hereinafter). In this embodiment, the first and second planes 5, 6 have an elliptical shape.

Figure 8:
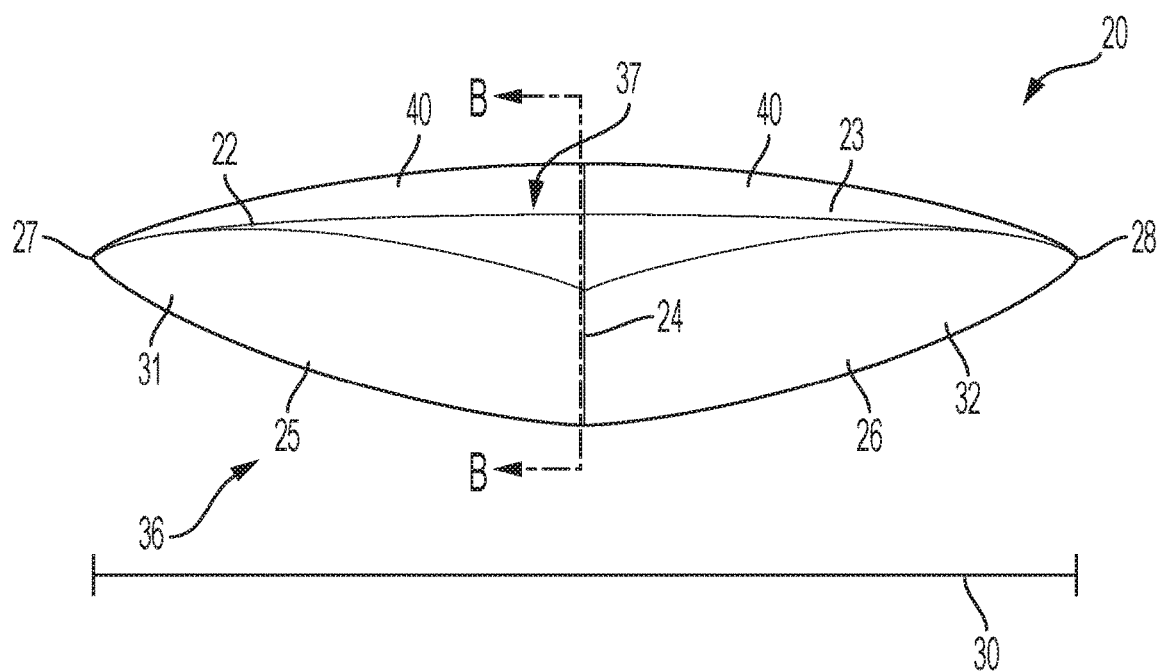
FIG. 8 depicts a first perspective view of a Busemann-Sears-Haack hybrid body fuselage according to another embodiment.

Referring now to FIG. 8, a perspective view of another embodiment of a Busemann-Sears-Haack hybrid body fuselage 20 of a supersonic aircraft is shown. The fuselage 20 has a fuselage body 22, and an entire length 30 that extends from a first end 27 of the fuselage 20 to a second end 28 of the fuselage 20. The fuselage 20 may be referred to as a Busemann-Sears-Haack hybrid body fuselage. The configuration of the fuselage 20 can be conceptualized as follows. A vertical bisection is made along a length of a Seas-Haack body shape, such as the Sears-Haack body shape 1000 of FIG. 27, creating two Sears-Haack body halves that are mirror images of each other. These two Sears-Haack body halves are then separated such that each half has a curved side and a flat plane having an ellipse shape. Taking one of the Sears-Haack body halves, that Sears-Haack body half has a cross section that is a semi-circle, and an entire length from a first end to a second end. The minor axis of the flat plane of that Sears-Haack body half is extended outwards away from the flat plane such that two flat planes are formed.

As shown in FIG. 8, the fuselage 20 has a first side 35 and a second side 36. At a center of the fuselage body 22 along the length 30 is a center edge 24. The center edge 24 is located on the second side 36 of the fuselage 20. Opposite the center edge 24 is an outer center 39 of the fuselage 20 on the first side 35 of the fuselage 20. The fuselage 20 has a first plane 25 that extends from the first end 27 to the center edge 24. Extending from the second end 28 to the center edge 24 is a second plane 26. The first plane 25 has a first surface area 31 and the second plane 26 has a second surface area 32. The first and second planes 25, 26 are flat. The fuselage body 22 has a surface 23. The fuselage 20 has an entire surface area 33 defining the surface 23.

Different from the fuselage embodiment described with respect to fuselage 1 and shown in FIGS. 1-7, in this embodiment of fuselage 20 the cross section of the fuselage 20 taken at the center edge 24 along line B-B is not a circle, but has three straight portions, with a curve that connects two of the portions (shown in FIGS. 14, 15 and described hereinafter).

Figure 9:
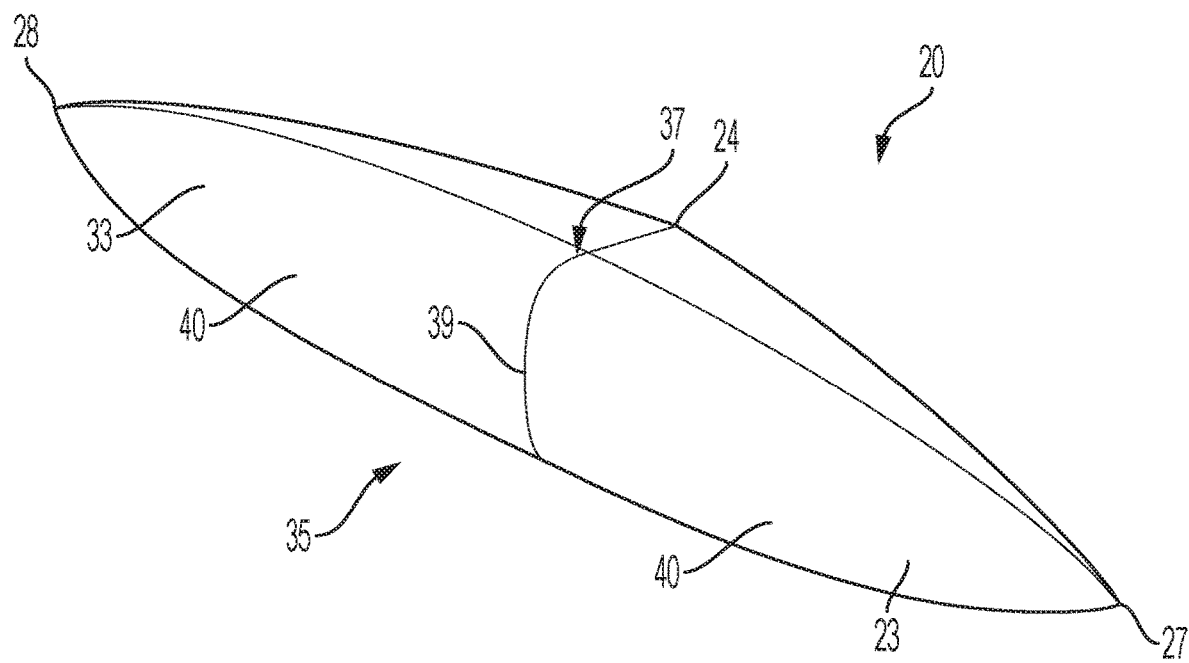
FIG. 9 depicts a second perspective view of the Busemann-Sears-Haack hybrid body fuselage of FIG. 8 according to one embodiment.
Figure 10:
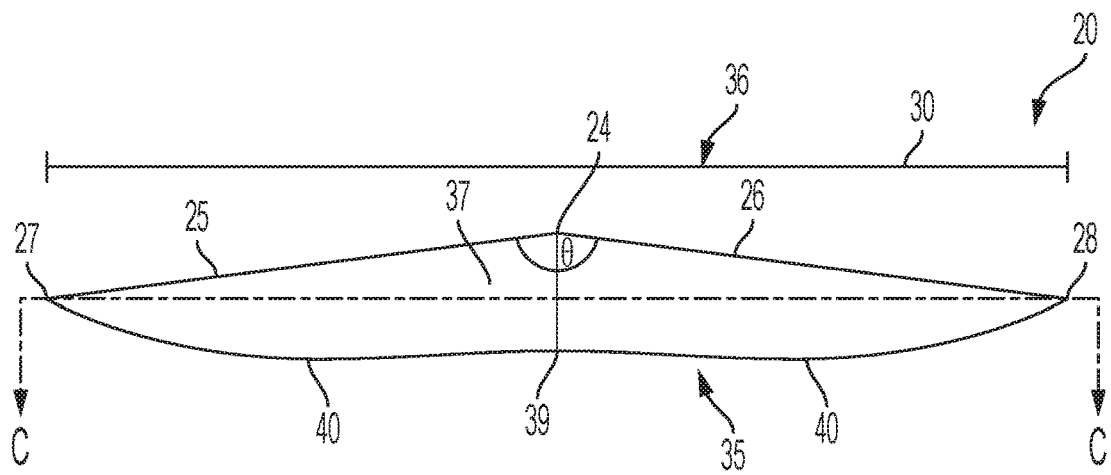
FIG. 10 depicts a top view of the Busemann-Sears-Haack hybrid body fuselage of FIGS. 8-9 according to one embodiment.
Figure 11:
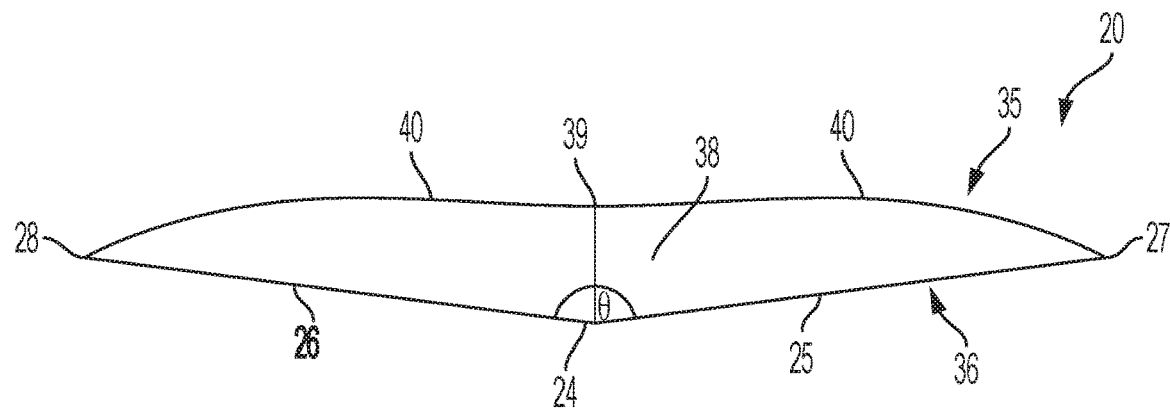
FIG. 11 depicts a bottom view of the Busemann-Sears-Haack hybrid body fuselage of FIGS. 8-10 according to one embodiment.

With reference to FIG. 10, a top view of the Busemann-Sears-Haack hybrid body fuselage 20 of FIGS. 8-9 is shown according to one embodiment. In this embodiment, the surface 23 of the fuselage body 22 has a curve at the outer center 39 on the second side 36 that curves inward towards the center edge 24, and a convex curve 40 on either side of the outer center 39. The fuselage body 22 is not limited to having this shape. For example, the fuselage body 22 of fuselage 20 may have a smooth convex curve from the first end 27 to the second end 28. A cross-section of the fuselage 20 taken along line C-C has a Sears-Haack body shape outline. With reference to FIG. 11, a bottom view of the Busemann-Sears-Haack hybrid body fuselage 20 of FIGS. 8-10 is shown according to one embodiment. In this embodiment, the top 37 and bottom 38 of the fuselage 20 are mirror-images of each other. At the center edge 24, the first and second planes 25, 26 form an obtuse angle θ.

Figure 12:
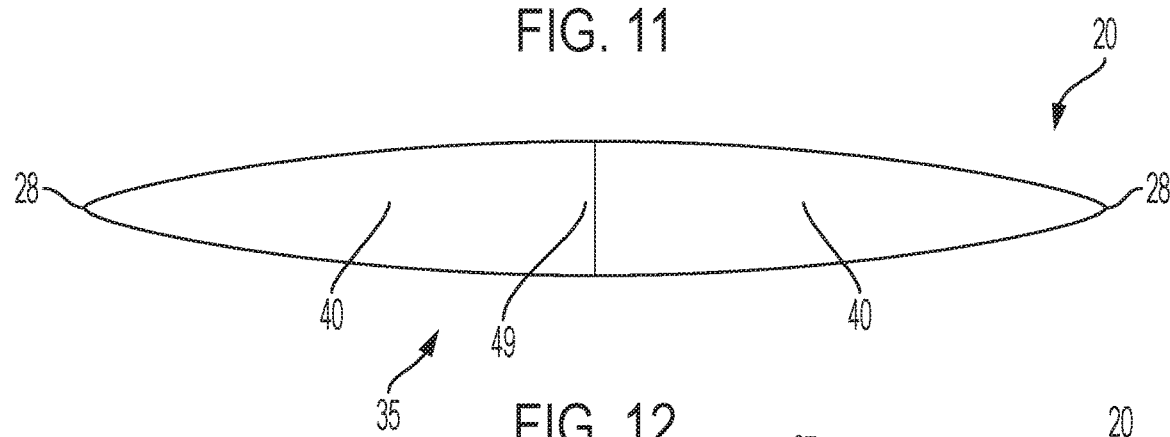
FIG. 12 depicts a first side view of the Busemann-Sears-Haack hybrid body fuselage of FIGS. 8-11 according to one embodiment.
Figure 13:
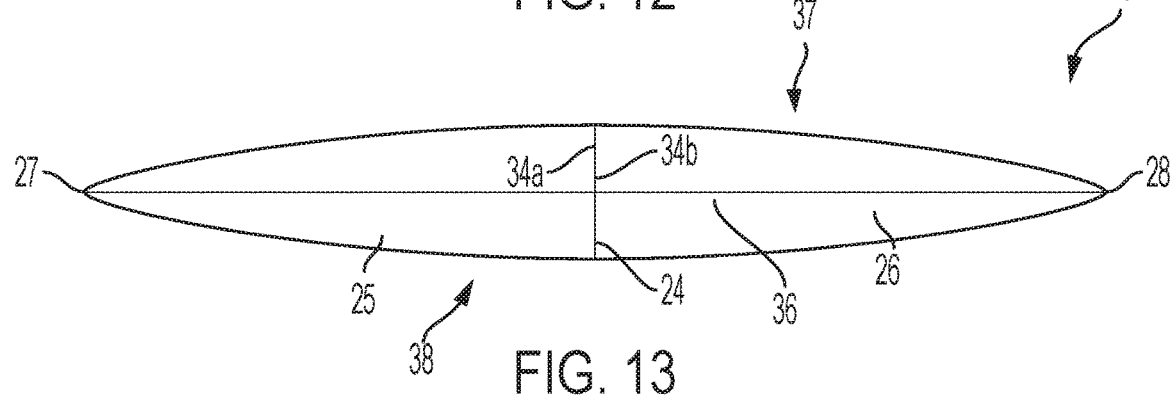
FIG. 13 depicts a second side view of the Busemann-Sears-Haack hybrid body fuselage of FIGS. 8-12 according to one embodiment.

With reference to FIG. 12, a first side view of the Busemann-Sears-Haack hybrid body fuselage 20 of FIGS. 8-11 is shown according to one embodiment. The first side 35 is shown. The first side 35 may be referred to as the outer side. The term "outer" refers to the position of the fuselage 20 in relation to a space between two Busemann-Sears-Haack fuselages 20. With reference to FIG. 13, a second side view of the Busemann-Sears-Haack hybrid body fuselage 20 of FIGS. 8-12 is shown according to one embodiment. The second side 36 is shown. The second side 36 side may be referred to as the inner side. The term "inner" refers to the position of the fuselage 20 in relation to a second Busemann-Sears-Haack hybrid fuselage 20 when two Busemann-Sears-Haack body fuselages 20 are arranged to form a Busemann biplane geometry within a space between the two Busemann-Sears-Haack hybrid fuselages 20. Different from the Busemann-Sears-Haack hybrid fuselage embodiment of fuselage 1 in which the first and second planes 5, 6 were elliptical in shape, in this Busemann-Sears-Haack hybrid fuselage embodiment of fuselage 20, the first plane 25 includes a straight edge 34a abutting the center edge 24, and the second plane 26 includes a straight edge 34b abutting the center edge 24.

Figure 14:
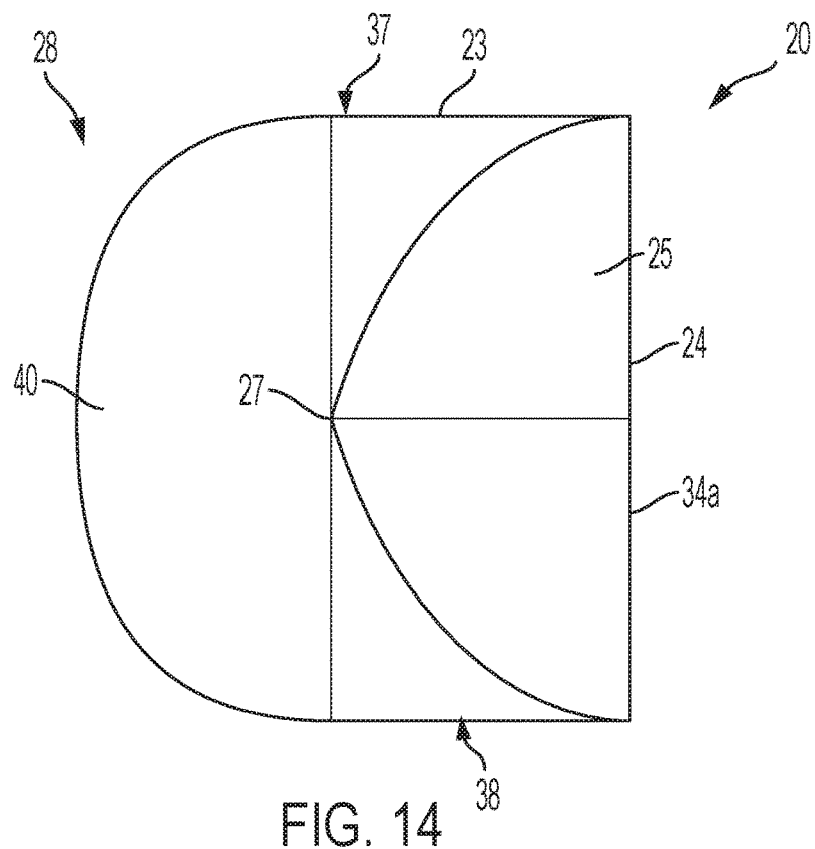
FIG. 14 depicts a front view of the Busemann-Sears-Haack hybrid body fuselage of FIGS. 8-13 according to one embodiment.
Figure 15:
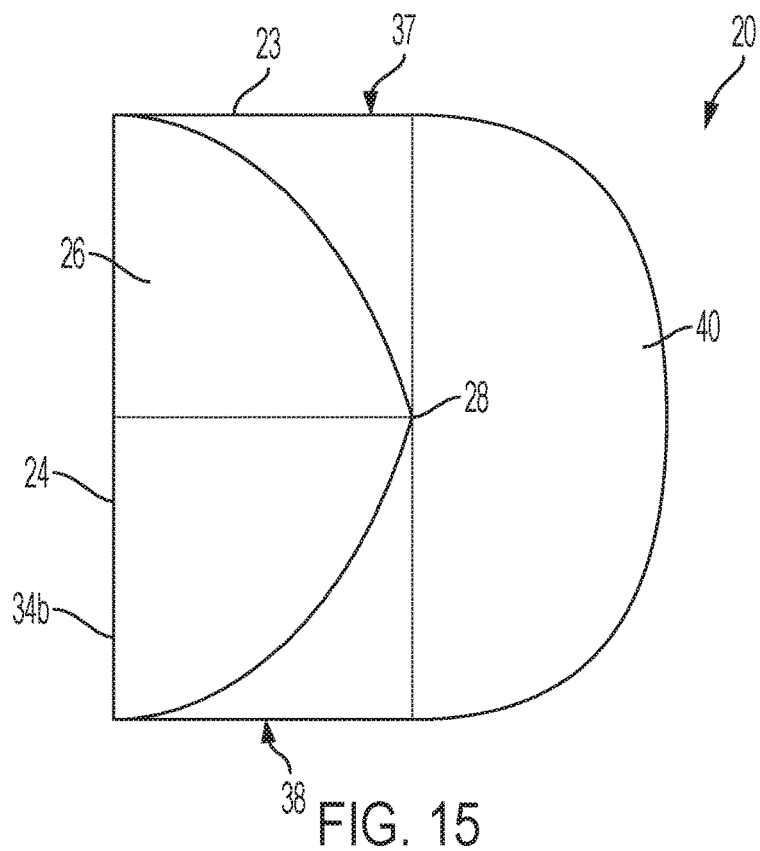
FIG. 15 depicts a back view of the Busemann-Sears-Haack hybrid body fuselage of FIGS. 8-14 according to one embodiment.

With reference to FIG. 14 a front view of the Busemann-Sears-Haack hybrid body fuselage 20 of FIGS. 8-13 is shown according to one embodiment. The first plane 25 extends from the center edge 24 to the first end 27, and the straight edge 34a of the first plane 25 abuts the center edge 24. The surface 23 of the fuselage 20 at the top 37 of the fuselage 20 includes a flat area. The surface 23 of the fuselage 20 at the bottom 38 of the fuselage 20 includes a flat area. With reference to FIG. 15, a back view of the Busemann-Sears-Haack hybrid body fuselage 20 of FIGS. 8-14 is shown according to one embodiment. The second plane 26 extends from the center edge 24 to the second end 28, and the straight edge 34b of the second plane 26 abuts the center edge 24.

Figure 16:
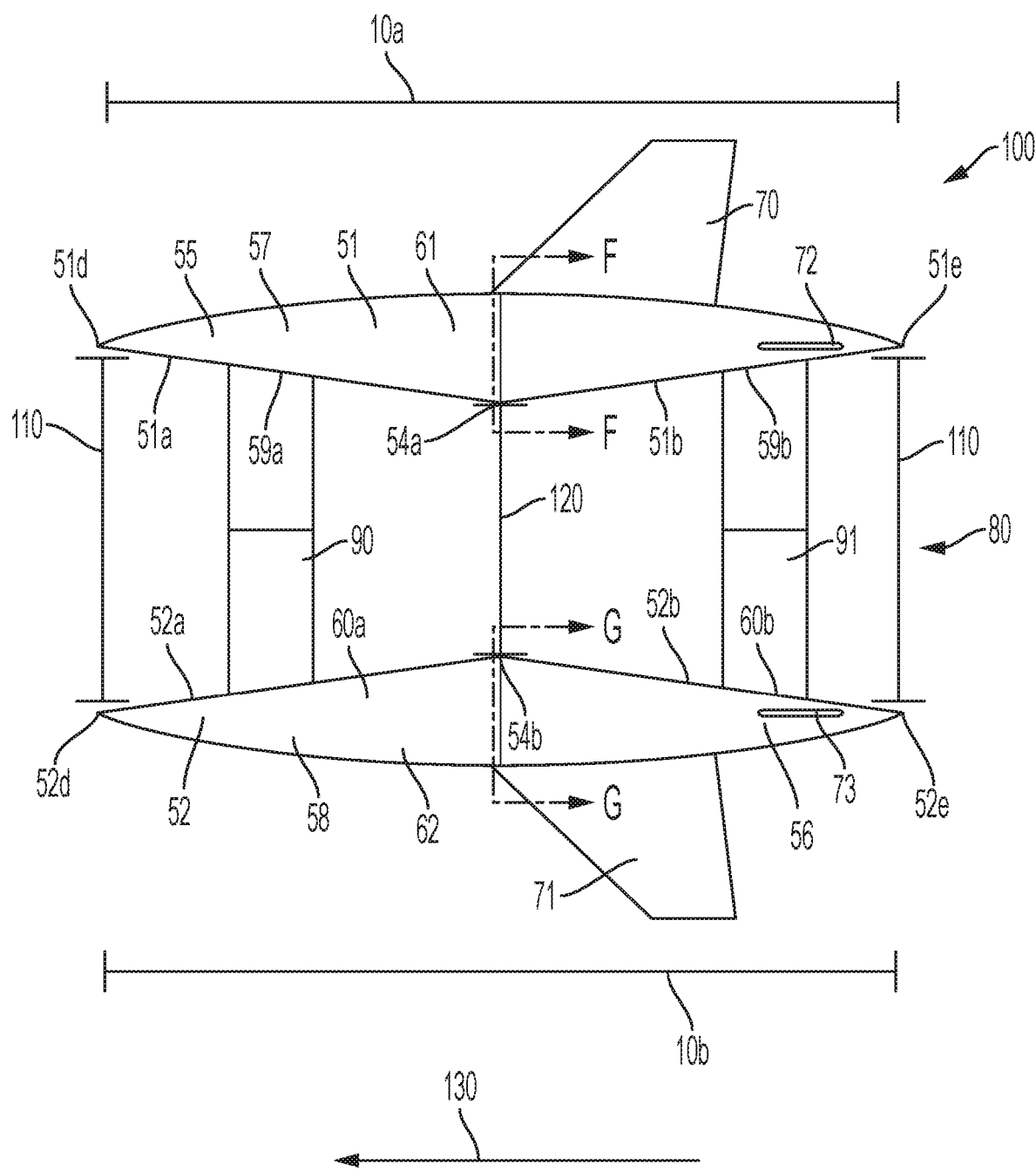
FIG. 16 depicts a top view of a twin fuselage aircraft having two Busemann-Sears-Haack hybrid body fuselages of FIGS. 1-7 according to one embodiment.

Embodiments of a Busemann-Sears-Haack hybrid fuselage such as fuselages 1, 20 may be incorporated into supersonic aircraft. Referring now to FIG. 16, a top view of a twin fuselage aircraft 100 with a Busemann-Sears-Haack hybrid body fuselage configuration is shown according to one embodiment. In this embodiment, the supersonic aircraft 100 includes a first fuselage 51 and a second fuselage 52. The first and second fuselages 51, 52 may be referred to as Busemann-Sears-Haack hybrid body fuselages. In this embodiment, the first and second fuselages 51, 52 have the configuration of fuselage 1 shown in and described with respect to FIGS. 1-7. The first and second fuselages 51, 52 are not limited to having the configuration of the fuselage 1 embodiment shown in and described with respect to FIGS. 1-7 and may have another configuration, for example, the configuration of fuselage 20 shown in and described with respect to FIGS. 8-15, or another configuration.

In this embodiment, the first fuselage 51 and second fuselage 52 have the same shape, and arranged apart from and parallel to each other such that there is a space 80 in between the first and second fuselages 51, 52. The first fuselage 51 has an entire length 10a that extends between the first end 51d and the second end 51e, and the second fuselage 52 has an entire length 10b that extends between the first end 52d and the second end 52e. In this embodiment, the lengths 10a, 10b of the first and second fuselages 51, 52 are equal. The first and second fuselages 51, 52 are arranged such that the entire lengths 10a, 10b of the first and second fuselages 51, 52 are parallel to each other. The first fuselage 51 and second fuselage 52 are arranged such that the first fuselage 51 is a mirror image of the second fuselage 52.

The first fuselage 51 has a first fuselage body 55. The second fuselage has a second fuselage body 56. The first fuselage body 55 has a first end 51d and a second end 51e. The second fuselage body 56 has a first end 52d and a second end 52e. The first ends 51d, 52d may be referred to as leading edges and the second ends 51e, 52e may be referred to as trailing edges. In this embodiment the first and second fuselages 51, 52 each have an entire length 10a, 10b that are equal. The entire length 10a of the first fuselage 51 extends between the first end 51d and second end 51e. The entire length 10b of the second fuselage 52 extends between the first end 52d and second end 52e. The first fuselage 51 has a center point 54a located at the center of the first fuselage body 55 along entire length 10a on a curved surface 61 of the first fuselage 51. The second fuselage 52 has a center point 54b located at the center of the second fuselage body 56 along entire length 10b on a curved surface 62 of the second fuselage 52.

The first fuselage 51 has a first plane 51a and a second plane 51b and the second fuselage 52 has a first plane 52a and a first plane 52b. The first plane 51a of the first fuselage 51 extends between the first end 51d and the center point 54a. The second plane 51b of the first fuselage 51 extends between the second end 51e and the center point 54a. The first plane 52a of the second fuselage 52 extends between the first end 52d and the center point 54b, and the second plane 52b of the second fuselage 52 extends between the second end 52e and the center point 54b. The first plane 51a of the first fuselage 51 faces the first plane 52a of the second fuselage 52 and the second plane 51b of the first fuselage 51 faces the second plane 52b of the second fuselage 52 such that a Busemann biplane geometry is formed within the space 80.

The first plane 51a of the first fuselage 51 has a first surface area 59a and the second plane 51b of the first fuselage 51 has a second surface area 59b. Likewise, the first plane 52a of the second fuselage 52 has a first surface area 60a and the second plane 52b of the second fuselage 52 has a second surface area 60b. In this embodiment, the surface areas 59a, 59b, 60a, 60b are equal.

The first fuselage body 55 has an entire surface area 57 and the second fuselage has an entire surface area 58. The entire surface area 57 of the first fuselage 51 includes the first surface area 59a and the second surface area 59b of the first and second planes 51a, 51b. The first fuselage body 55 has a curved surface 61 that defines a portion of the entire surface area 57 that is not defined by the first and second surface areas 59a, 59b. The curved surface 61 abuts the first and second planes 51a, 51b and conforms to a Sears-Haack body shape configuration. The entire surface area 58 of the second fuselage 52 includes the first surface area 60a and the second surface area 60b of the first and second planes 52a, 52b. The second fuselage body 56 has a curved surface area 62 that defines a portion of the entire surface area 58 that is not defined by the first and second surface areas 60a, 60b of the second fuselage 52. The curved surface 62 of the second fuselage abuts the first and second planes 52a, 52b and conforms to a Sears-Haack body shape configuration.

The first fuselage body 55 has a circular cross section taken at the center point 54a along line F-F. A cross section of the first fuselage body 55 taken at any point along the entire length 10a of the first fuselage body 55 other than at the center point 54a will have a chord (a straight line) formed by the first or second surface areas 59a, 59b of the first or second planes 51a, 51b and a curve formed by the curved surface area 61 that begins at one end of the chord and ends at the other end of the chord.

Likewise, the second fuselage body 56 has a circular cross section taken at the center point 54a along line G-G. A cross section of the second fuselage body 56 taken at any point along the entire length 10b of the second fuselage body 56 other than at the center point 54b will have a chord (a straight line) formed by the first or second surface areas 60a, 60b of the first or second planes 52a, 52b and a curve formed by the curved surface area 62 that begins at one end of the chord and ends at the other end of the chord.

The space 80 between the first fuselage 51 and the second fuselage 52 includes a first distance 110 extending between the first end 51d of the first fuselage 51 and the first end 52d of the second fuselage 52, a second distance 110 between the second end 51e of the first fuselage 51 and the second end 52e of the second fuselage 52, and a third distance 120 between the center point 54a of the first fuselage 51 and the center point 54b of the second fuselage 52. In this embodiment, the distance between the center points 54a, 54b is less than the distances 110 between the first ends 51d, 52d and the second ends 52, 52e. Within the space 80, the first planes 51a, 52a are configured such that the distance between the first planes 51a, 52a increases from the center points 54a, 54b (at which the first planes 51a, 52a are a distance 120 apart) to the first ends 51d, 52d (at which the first planes 51a, 52a are a distance 110 apart). Within the space 80, the second planes 514b, 52b are configured such that the distance between the second planes 514b, 52b increases from the center points 54a, 54b (at which the second planes 514b, 52b are a distance 120 apart) to the second ends 51e, 52e (at which the second planes 51b, 52b are a distance 110 apart). In application, when the twin fuselage aircraft 100 is moving in direction 130, the combination of the Busemann biplane geometry applied to the first and second fuselages 51, 52 within the space 80 and the Sears-Haack body shape of the curved surfaces 61, 62 of the first and second fuselages 51, 52 provides the benefits of low wave drag characteristics of a Sears-Haack body shape, as well as the reduction of wave drag by the Busemann biplane geometry of the first and second fuselages 51, 52, wherein pressure drops to freestream pressure near the second ends 51e, 52e, which may be referred together as the trailing edges of the twin fuselage aircraft 100. In addition, the Busemann biplane geometry within the space 80 permits a reflected shockwave and expansion fan to cancel out exactly at the trailing edges, such that no shock wave propagates out of the Busemann biplane geometry configuration and reaches the ground. This Busemann-Sears-Haack fuselage shape is configured to reduce wave drag per volume of given fuselage volume and length and to take advantage of a Busemann biplane no-lift condition in a multi-fuselage configuration having a Busemann biplane geometry.

With continuing reference to FIG. 16, the first fuselage 51 has a first wing 70 extending from the first fuselage 51, and a second wing 71 extends from the second fuselage 52. The position of the wings is not limited to being extending from the first and second fuselages 51, 52. For example, the wings may be located between the first and second fuselages 51, 52, or on another part of the twin fuselage aircraft. Further, the twin fuselage aircraft 100 is not limited to having two wings, and may have any number of wings, or no wings. Moreover, the twin fuselage aircraft 100 is not limited to having wings that extend perpendicular to the lengths 10a, 10b of the first and second fuselages 51, 52, and may have wings that extend at a different angle from the twin fuselage aircraft 100. The wings 70, 71 may include winglets, flaps, slats, tabs, and/or other drag-reduction features. The twin fuselage aircraft 100 is further shown having two stabilizers, a first stabilizer 72 on the first fuselage 51 and a second stabilizer 73 on the second fuselage 52. The twin fuselage aircraft 100 is not limited to having two stabilizers 72, 73, and may have any number, position, and configuration of stabilizers. The twin fuselage aircraft 100 may have no stabilizers. The first and second stabilizers 72, 73 are not limited to being positioned on the first and second fuselages 51, 52 and may be positioned elsewhere on the twin fuselage aircraft 100. The first and second stabilizers 72, 73 may include additional flight control components such as elevators, rudders, and the like.

With continuing reference to FIG. 16, in this embodiment, the first and second fuselages 51, 52 are connected. In this embodiment, the first and second fuselages 51, 52 are connected by two pairs of stacked struts 90, 91. A first pair of stacked struts 90 connect the first planes 51a, 52a of the first and second fuselages 51, 52 and a second pair of stacked struts 91 connect the second planes 51b, 52b of the first and second fuselages 51, 52. The struts of the first and second pairs of stacked struts 90, 91 may be spars, bars, connectors, and the like. As described infra with respect to FIG. 22, a Busemann biplane geometry may also be applied to inner surfaces of the pairs of stacked struts 90, 91.

Figure 17:
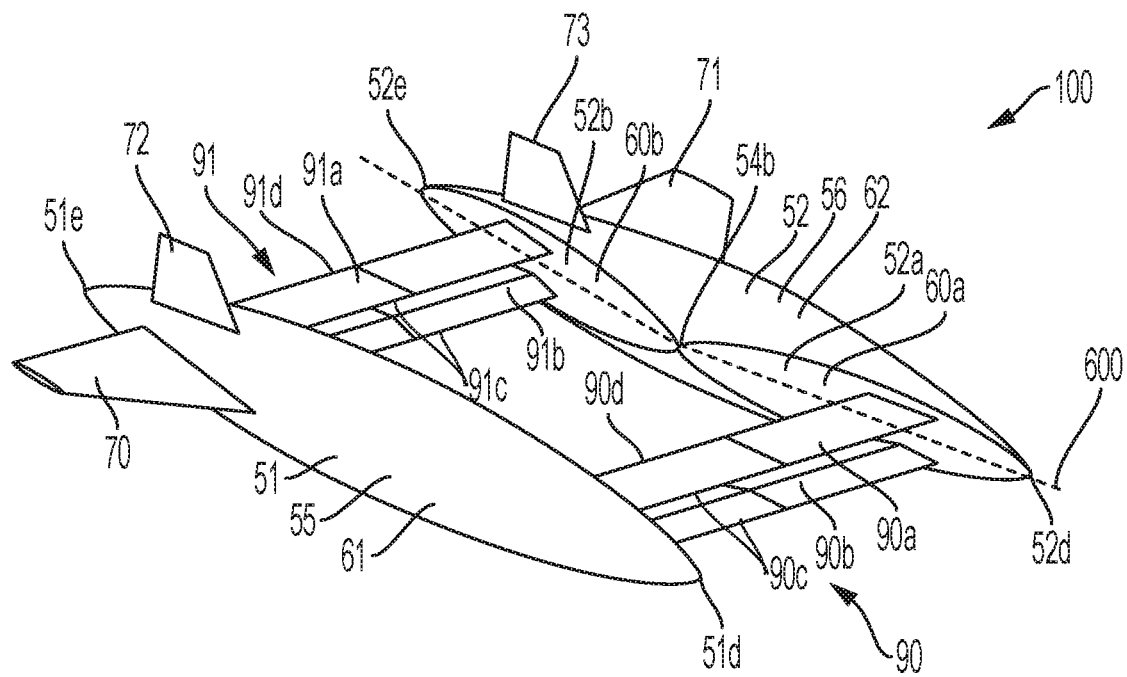
FIG. 17 depicts a first perspective view of the twin fuselage aircraft of FIG. 16 according to one embodiment.
Figure 18:
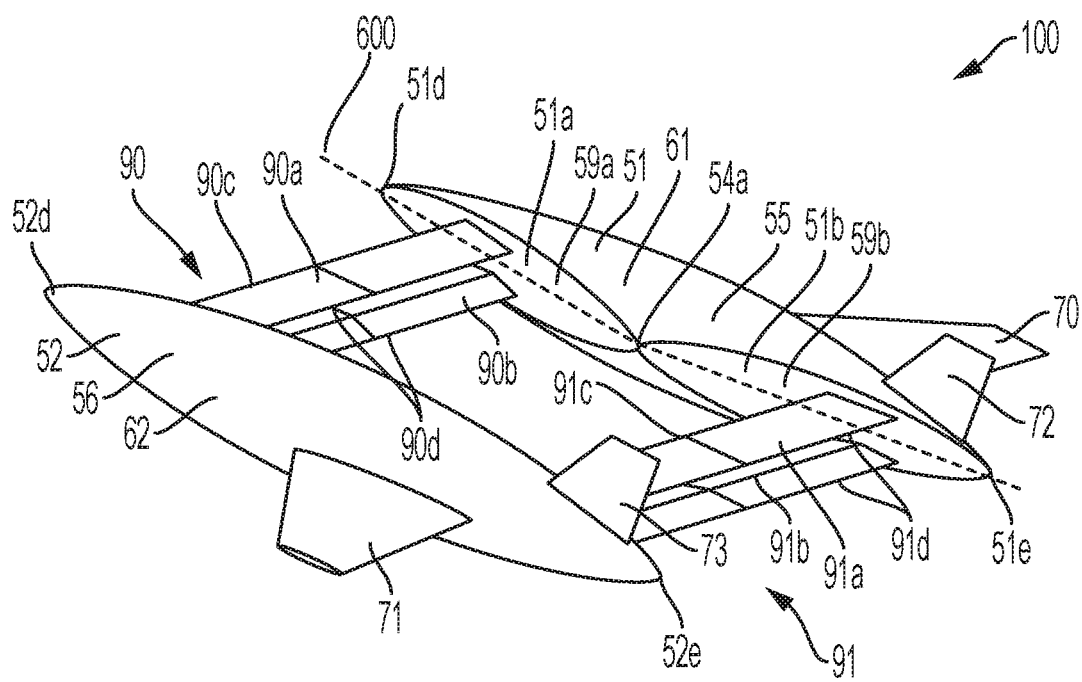
FIG. 18 depicts a second perspective view of the twin fuselage aircraft of FIGS. 16-17 according to one embodiment.

Referring now to FIGS. 17 and 18, a first perspective view of the twin fuselage aircraft 100 of FIG. 16 is shown in FIG. 17, and a second perspective view of the twin fuselage aircraft 100 of FIGS. 16-17 is shown in FIG. 18 according to one embodiment. Shown in FIG. 17, the first plane 52a and second plane 52b of the second fuselage 52 are configured such that an imaginary straight line 600 drawn across the first and second planes 52a, 52b from the first end 52d to the second end 52e intersects the center point 54b, and the first and second planes 52a, 52b have symmetrical halves on either side of the imaginary straight line 600. Likewise, shown in FIG. 18, the first plane 51a and second plane 51b of the first fuselage 51 are configured such that an imaginary straight line 600 drawn across the first and second planes 51a, 51b from the first end 51d to the second end 51e intersects the center point 54a and the first and second planes 51a, 51b have symmetrical halves on either side of the imaginary line 600.

With continuing reference to FIGS. 17 and 18, the first pair of stacked struts 90 extends horizontally between the first plane 51a of the first fuselage 51 and the first plane 52a of the second fuselage 52. The first pair of stacked struts 90 includes a top strut 90a and a bottom strut 90b, the second pair of stacked struts 90 extend horizontally between second plane 52a of the first fuselage 51 and the second plane 52b of the second fuselage 52. The second pair of stacked struts 91 includes a top strut 91a and a bottom strut 91b. The positions of the first and second pair of stacked struts 90, 91 are not limited to these positions. For example, the first and second pairs of stacked struts 90, 91 may be located at any point along the lengths 10a, 10b such that the first fuselage 51 and second fuselage 52 are connected. Further, the twin fuselage aircraft 100 is not limited to having two pairs of stacked struts and may have a single pair of stacked struts, a single strut, multiple struts that are not stacked, and the like. The top and bottom struts 90a, 90b of the first pair of stacked struts 90 each have a leading edge 90c and a trailing edge 90d. The top and bottom struts 91a, 91b of the second pair of stacked struts 91 each have a leading edge 91c and a trailing edge 91d.

Figure 19:
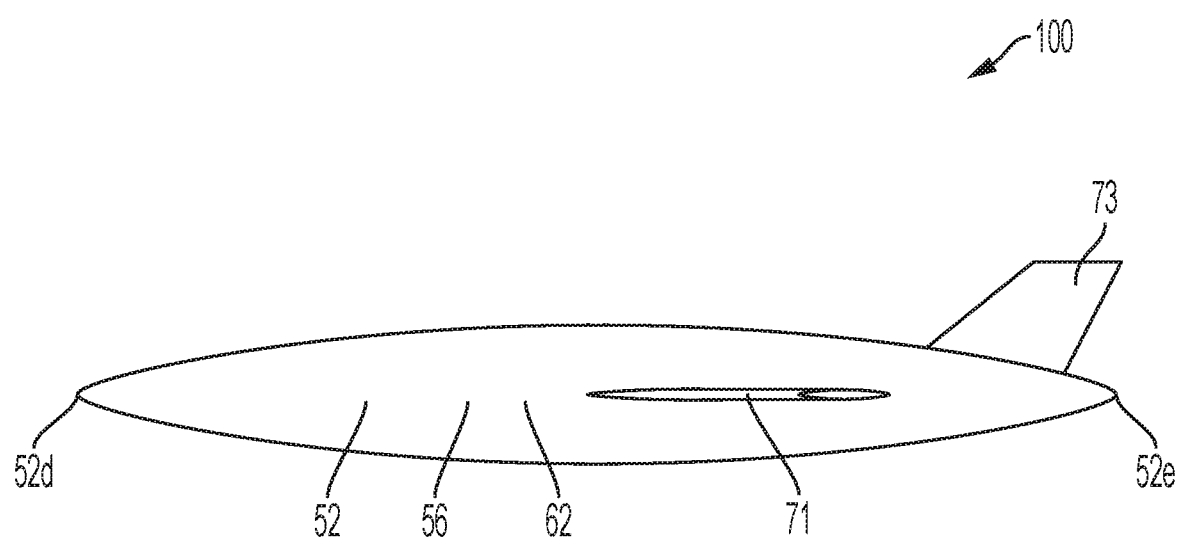
FIG. 19 depicts a side view of the twin fuselage aircraft of FIGS. 16-18 according to one embodiment.
Figure 20:
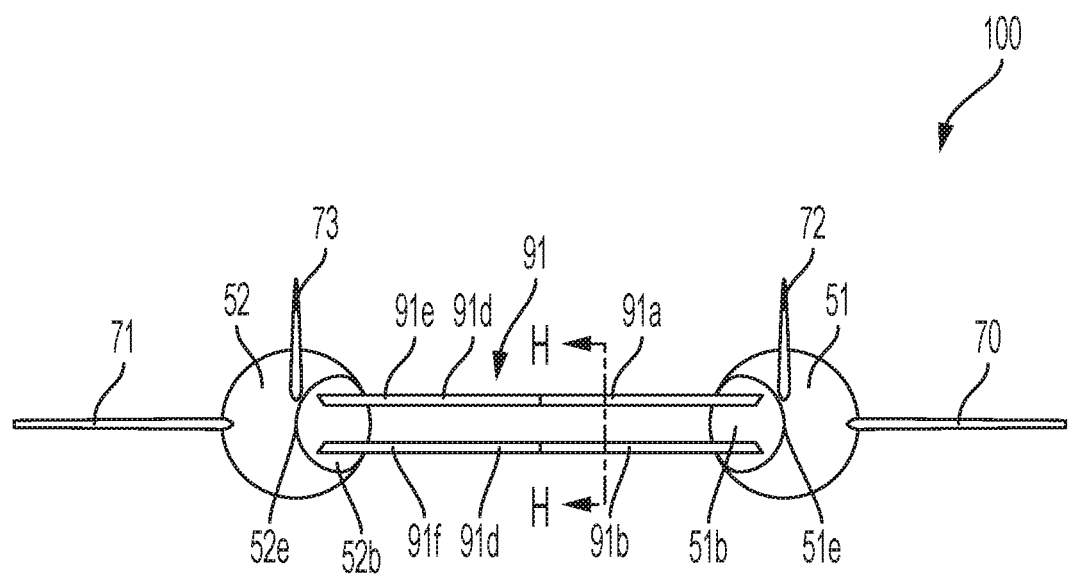
FIG. 20 depicts a back view of the twin fuselage aircraft of FIGS. 16-19 according to one embodiment.
Figure 21:
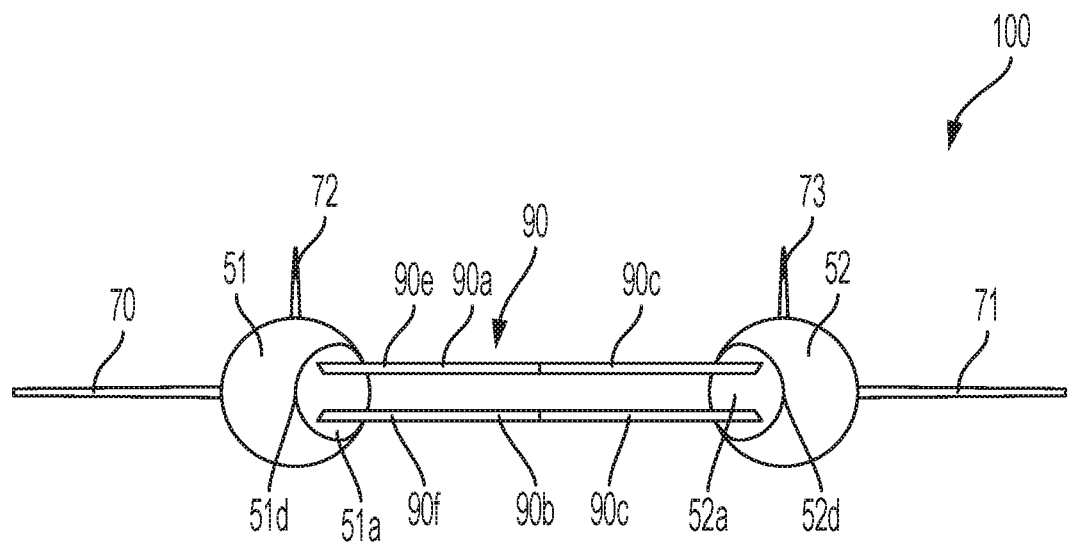
FIG. 21 depicts a front view of the twin fuselage aircraft of FIGS. 16-20 according to one embodiment.

With reference to FIG. 19, a side view of the twin fuselage aircraft 100 is shown. In this embodiment, the side profiles of the first and second second fuselages 51, 52 have a Sears-Haack body side profile shape. With reference to FIGS. 20-21, a rear view and front view of the twin fuselage aircraft 100 of FIGS. 16-19 are shown, respectively, according to one embodiment. As described supra, a cross section of the first fuselage body 55 taken at the center point 54a is a circle, and a cross section of the second fuselage body 56 taken at the center point 54b is a circle. The top strut 91a of the second pair of stacked struts 91 has a flat top surface 91e, and the bottom strut 91b of the second pair of stacked struts 91 has a flat bottom surface 91f. The flat top surface 91e and flat bottom surface 91f are parallel. The top strut 90a of the first pair of stacked struts 90 has a flat top surface 90e, and the bottom strut 90b of the first pair of stacked struts 90 has a bottom flat surface 90f. The flat top surface 90e and bottom flat surface 90f are parallel. The top struts 90a, 91a are not limited to having flat top surfaces, and may have top surfaces that are not flat. The top struts 90a, 91a are not limited to having flat top surfaces that are a continuous flat plane, and may have top surfaces that have more than one plane. The bottom struts 90b, 91b are likewise not limited to having flat bottom surfaces, and may have bottom surfaces that are not flat, and are not limited to having flat bottom surfaces that are a continuous flat plane, and may have bottom surfaces that have more than one plane.

Figure 22:
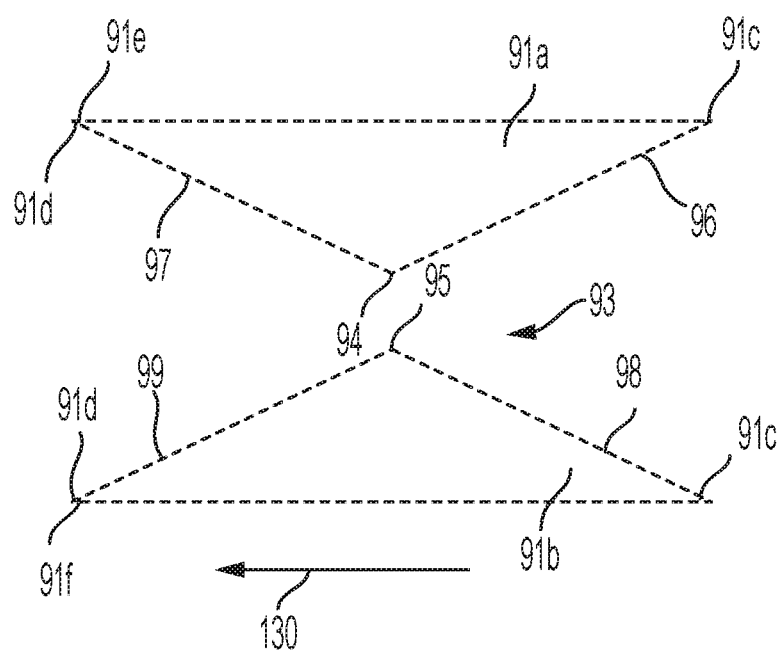
FIG. 22 depicts a cross-sectional view of a first pair of stacked struts of the twin fuselage aircraft of FIGS. 16-21 taken along line H-H of FIG. 20.

Referring now to FIG. 22, a cross-sectional view of the second pair of stacked struts 91 is shown taken along line H-H of FIG. 20. The top strut 91a has a leading edge 91c and a trailing edge 91d, and the bottom strut 91b has a leading edge 91c and trailing edge 91d. The leading edges 91c may have identical angles, or different angles. The trailing edges 91d may have identical angles, or different angles. The leading and trailing edges 91c, 91d may all have equal angles. The leading and trailing edges 91c, 91d may each have a different angle. A space 93 is between the top strut 91a and bottom strut 91b, and the top and bottom struts 91a, 91b form a Busemann biplane geometry within the space 93. The top strut 91a has a first plane 96 that extends from the leading edge 91c of the top strut 91a to a center point 94 of the top strut 91a, and a second plane 97 that extends from the center point 94 to the trailing edge 91d of the top strut 91a. The bottom strut 91b has a first plane 98 that extends from the leading edge 91c of the bottom strut 91b to a center point 95 of the bottom strut 91b, and a second plane 99 that extends from the center point 95 to the trailing edge 91d. The first and second planes 96, 97, 98, 99 are configured such that when the twin fuselage aircraft 100 is in motion in direction 130, shock waves generated are reflected between the top strut 91a and the bottom strut 91b and are eventually cancelled out by an expansion fan from the diverging section from the center points 94, 95 to the trailing edges 91d, and such that pressure exerted on the first and second planes 96, 97, 98, 99 is kept nearly constant for a majority of the distance along the top flat surface 91e from the leading edge 91c of the top strut 91a to the trailing edge 91d of the top strut 91a, and along the bottom flat surface 91f from the leading edge 91c of the bottom strut 90b to the trailing edge 91d of the bottom strut 91b, and drops to freestream pressure near the trailing edges 91d of the first and second struts 91a, 91b. The first pair of stacked struts 90 may be configured the same way as the second pair of stacked struts 91, or may be configured differently. The first and second pairs of stacked struts 90, 91 are not limited to having a Busemann biplane geometry. For example, the first and second pairs of stacked struts 90, 91 may not include the first and second planes 96, 97, 98, 99.

Figure 23:
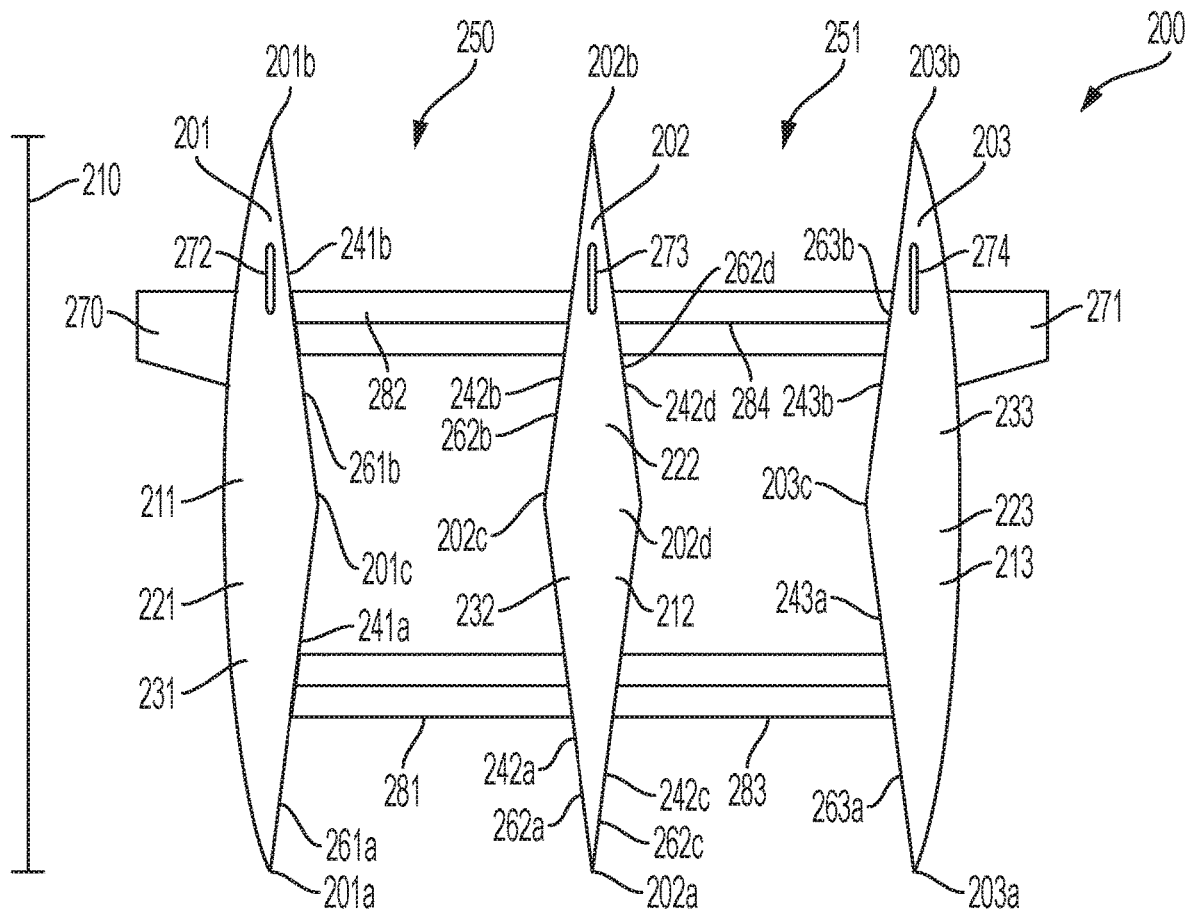
FIG. 23 depicts a top view of a three-Busemann-Sears-Haack hybrid body fuselage supersonic aircraft according to one embodiment.
Figure 24:
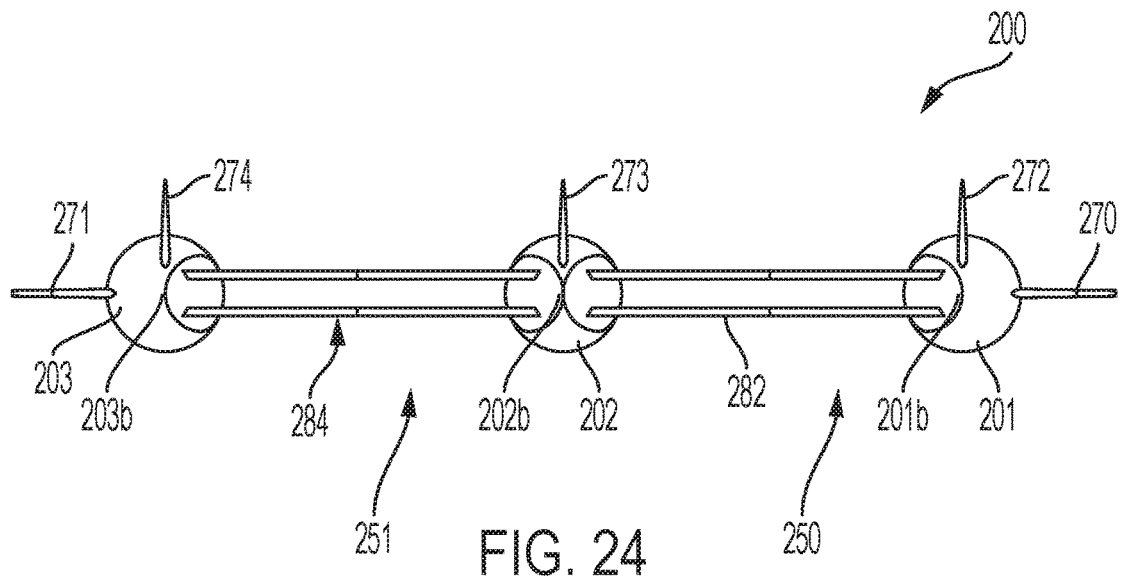
FIG. 24 depicts a back view of the three-Busemann-Sears-Haack hybrid body fuselage supersonic aircraft of FIG. 23 according to one embodiment.

Referring now to FIGS. 23-24, an embodiment of a triple fuselage aircraft 200 with Busemann-Sears-Haack hybrid body fuselages is shown. In this embodiment, the triple fuselage aircraft 200 includes a first fuselage 201, second fuselage 202, and third fuselage 203. The triple fuselage aircraft 200 includes a first wing 270 extending from the first fuselage 201, and a second wing 271 extending from the third fuselage 203. The triple fuselage aircraft 200 is not limited to having this configuration of wings 270, 271. For example, the triple fuselage aircraft 200 may have more than two wings. As another example, the triple fuselage aircraft 200 may have wings in another location along the first and third fuselages 201, 203. In this embodiment, the first fuselage 201 has a first stabilizer 272, the second fuselage 202 has a second stabilizer 273, and the third fuselage 203 has a third stabilizer 274. The triple fuselage aircraft 200 is not limited to having stabilizers 272, 273, 274, and may have any number, position, and configuration of stabilizers. The triple fuselage aircraft 200 may have zero stabilizers. The first, second, and third stabilizers 272, 273, 274 are not limited to being positioned on the first, second, and third fuselages 201, 202, 203 and may be positioned elsewhere on the triple fuselage aircraft 200. The first, second, and third stabilizers 272, 273, 274 may be or include additional flight control components such as elevators, rudders, and the like.

In this embodiment, the first and second fuselages 201, 202 are arranged such that there is a first space 250 between the first and second fuselages 201, 202, and the second and third fuselages 202, 203 are arranged such that there is a second space 251 between the second and third fuselages 202, 203. The first and third fuselages 201, 203 may be referred to as outer fuselages and the second fuselage 202 may be referred to as the middle fuselage. The first and third fuselages 201, 203 are shown having the same configuration as the fuselage 1 shown in FIGS. 1-7, and the first and second fuselages 51, 52 of the twin fuselage aircraft embodiment shown in FIGS. 16-22. The outer fuselages of the triple fuselage aircraft 200 are not limited to having this configuration. For example, the first and third fuselages 201, 203 may have the configuration of fuselage 20 shown in FIGS. 8-15, or another configuration.

With continuing reference to FIG. 23, the first fuselage 201 has a first fuselage body 211. The first fuselage body 211 has a first end 201a and a second end 201b, a length 210 that extends between the first end 201a and second end 202b, and a center point 201c located on a center of the first fuselage body 211 along length 210 of the first fuselage 201. The first fuselage body 211 further has a first flat plane 241a extending from the center point 201c to the first end 201a and a second flat plane 241b extending from the center point 201c to the second end 201b.

The second fuselage 202 has a second fuselage body 212. The second fuselage body 212 has a first end 202a and a second end 202b, and a length 210 that extends between the first end 202a and second end 202b. The length 210 of the second fuselage body 202 is equal to the length 210 of the first fuselage 201 in this embodiment. The second fuselage body 212 has a first center point 202c located on a center of the second fuselage body 212 along length 210 of the second fuselage body 212, and a second center point 202d located opposite the first center point 202c on a center of the fuselage body 212 along the length 210 of the second fuselage body 202. The second fuselage body 212 has two sets of flat planes (242a, 242b facing the first fuselage 201 and described hereinafter, and 242c, 242d facing the third fuselage 203 and described hereinafter) such that a Busemann biplane geometry is formed by the second fuselage 202 and the first fuselage 201 within the first space 250, and such that a Busemann biplane geometry is formed by the second fuselage 202 and third fuselage 203 within the second space 251. The second fuselage body 202 has a first plane 242a that extends between the first end 202a and first center point 202c. A second plane 242b of the fuselage body 212 extends from the first center point 202c to the second end 202b. The first plane 242a faces the first plane 241a of the first fuselage body 211 and the second plane 242b faces the second plane 241b of the first fuselage body 211. Opposite the first plane 242a and second plane 242b of the second fuselage body 212 are a third plane 242c and a fourth plane 242d. The third plane 242c extends from the second center point 202d to the first end 202a, and the fourth plane 242d extends from the second center point 202d to the second end 202b. The third plane 242c faces a first plane 243a of the third fuselage body 213, and the fourth plane 242d faces the second plane 243b of the third fuselage body 213.

In this embodiment the third fuselage 203 is arranged such that the third fuselage 203 is a mirror image of the first fuselage 201 on the opposite side of the middle fuselage 202. The third fuselage body 203 has a first end 203a and a second end 203b, and a center point 203c on a center of the third fuselage body 213 along a length 210 of the third fuselage body 213. An entire length 210 of the third fuselage body 203 extends between the first end 203a and the second end 203b and is equal to the entire lengths 210 of the first and second fuselages 201, 202 in this embodiment. Extending between the center point 203c and the first end 203a is a first plane 243a and extending between the center point 203c and the second end 203b is a second plane 243b.

The first fuselage body 211 has an entire surface area 221. The entire surface area 221 includes a first surface area 261a of the first plane 241a, a second surface area 261b of the second plane 241b, and a curved surface portion 231 that defines a portion of the entire surface area 221 that is not defined by surface areas 261a, 261b. The curved surface portion 231 abuts the first and second planes 241a, 241b. The curved surface portion 231 conforms to a Sears-Haack body shape configuration. The second fuselage body 212 has an entire surface area 222. The entire surface area 222 includes a first surface area 262a of the first plane 242a, a second surface area 262b of the second plane 242b, a third surface area 262c of the third plane 242c, and a fourth surface area 262d of the fourth plane 242d. The second fuselage body 212 further has a curved surface portion 232 that that defines a portion of the entire surface area 222 that is not defined by the first, second, third, and fourth surface areas 262a, 262b, 262c, 262d. The curved surface portion 232 abuts the first, second, third, and fourth planes 241a, 241b, 241c, 241d. The curved surface portion 232 conforms to a Sears-Haack body shape configuration. The third fuselage body 203 has an entire surface area 223. The entire surface area 223 includes a first surface area 263a of the first plane 243a, a second surface area 263b of the second plane 243b, and a curved surface portion 233 that defines a portion of the entire surface area 223 that is not defined by the first and second surface areas 263a, 263b. The curved surface portion 233 abuts the first and second planes 243a, 243b. The curved surface portion 233 conforms to a Sears-Haack body shape configuration.

In this embodiment, the surface areas 261a, 261b, 262a, 262b, 262c, 262d, 263a, 263b of the planes 201a, 201b, 202a, 202b, 202c, 202d, 203a, and 203b are equal. In this embodiment, a cross section of the first fuselage body 211 taken at any point along the length 210 of the first fuselage body 211 other than at center point 201c will have a chord (a straight line) formed by first or second surface areas 261a, 261b, and a curve formed by the curved surface portion 231 that begins at one end of the chord and ends at the other end of the chord. Likewise, a cross section of the third fuselage body 213 taken at any point along the length 210 of the third fuselage body 213 other than at center point 203c will have a chord (straight line) formed by first or second surface area 263a, 263b, and a curve formed by the curved surface portion 233 that begins at one end of the chord and ends at the other end of the chord. In this embodiment, the second fuselage body 212, having the first and second planes 242a, 242b, and third and fourth planes 242c, 242d, will have a different cross section shape taken at any point along the length 210 of the second fuselage body 212 other than at center points 202c, 202d: the cross section will have two parallel chords (straight lines) formed by the first and third surface areas 262a, 262c or second and fourth surface areas 262b, 262d, connected at the ends of the chords by two curved lines formed by the curved surface portion 232 of the second fuselage body 212.

In this embodiment, a first pair of struts 281 extends horizontally between the first plane 241a of the first fuselage 201 and the first plane 242a of the second fuselage 202. A second pair of stacked struts 282 extends horizontally between the second plane 241b of the first fuselage 201 and the second plane 242b of the second fuselage 202. A third pair of stacked struts 283 extends between the third plane 242c of the second fuselage 202 and the first plane 243a of the third fuselage 203, and a fourth pair of stacked struts 284 extends horizontally between the fourth plane 242d of the second fuselage 202 and the second plane 243b of the third fuselage. One or more of the first, second, third and fourth pairs of stacked struts 281, 282, 283, 284 may include a Busemann biplane geometry, as the first and second pairs of stacked struts 90, 91 in the twin fuselage aircraft 100 embodiment described supra. Spars, bars, or other connection structures may be used as well to connect the first fuselage 201 and third fuselage 203 to the second fuselage 202.

The dimensions of the three fuselages 201, 202, 203 in the triple fuselage aircraft 200 are not limited the embodiment shown in FIG. 23. For example, the three fuselages 201, 202, 203 are not limited to being equal lengths 210. For example, the three fuselages 201, 202, 203 may have different lengths. As another example, the middle fuselage 202 may be larger in dimension than the two outer fuselages 201, 203. For example, the middle fuselage 202 may be longer and wider than the outer fuselages 201, 203. In any embodiment of dimensions and arrangement of the three fuselages 201, 202, 203, the Busemann biplane geometry within the spaces 250, and 251 may be maintained. In this embodiment, the first ends 201a, 202a, 203a may be referred to as the leading edges of the triple fuselage aircraft 200, and the second ends 201b, 202b, 203b may be referred to as the trailing edges.

Referring now to FIG. 24, a back view of the triple fuselage aircraft of FIG. 23 is shown according to one embodiment. In this embodiment, a cross section of the first, second, and third fuselages 201, 202, 203 taken at the center points 201c, 202c and 202d, and 203c are circles. However, in other embodiments, the fuselages 201, 202, 203 may have different dimensions and shapes. For example, the first and second fuselages 201, 202 may be shaped like the Busemann-Sears-Haack hybrid body fuselage 20 shown in FIGS. 8-15, and the second fuselage 202 may be shaped such that each pair of planes (242a, 242b, 242c, 242d) are shaped like the planes 25, 26 of the Busemann-Sears-Haack hybrid body fuselage 20. A combination of the fuselage shapes shown in FIGS. 1-7 and shown in 8-15 may be used in the triple fuselage aircraft 200.

A multiple fuselage aircraft having Busemann-Sears-Haack hybrid body shape fuselages may have more than two or three fuselages. For example, a multiple fuselage aircraft having Busemann-Sears-Haack hybrid body shape fuselages may have four fuselages. A multiple fuselage aircraft having Busemann-Sears-Haack hybrid body shape may have two, three, four, or more fuselages, and those fuselages may not be all arranged along a straight plane as the three fuselages in the embodiment of FIGS. 23, 24 are shown arranged. For example, in one embodiment, the middle fuselage 202 may be arranged higher or lower than the outer fuselages 201, 203.

Figure 25:
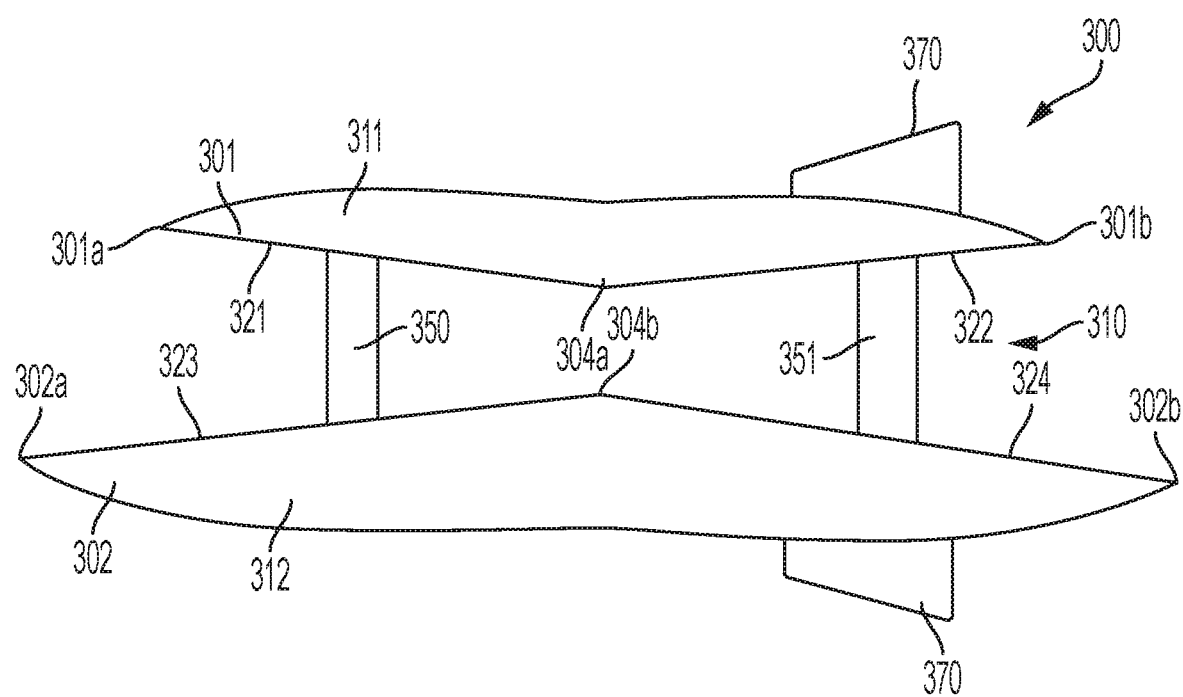
FIG. 25 depicts a top view of a two-Busemann-Sears-Haack hybrid body fuselage supersonic aircraft having asymmetrical configuration according to one embodiment.

Referring now to FIG. 25, another embodiment of a two-fuselage aircraft 300 is shown having first and second Busemann-Sears-Haack hybrid body fuselages 301, 302. The first fuselage 301 has a first fuselage body 311, and the second fuselage 302 has a second fuselage body 312. In this embodiment, the first fuselage body 311 and the second fuselage body 312 differ in dimension. The first fuselage body 311 is shorter in length than the second fuselage body 312. Each of the first and second fuselage body 311, 312 has the configuration of the fuselage 20 embodiment shown in FIGS. 8-15. In another embodiment, the first and second fuselage bodies 311, 312 may each have a different configuration, for example, the fuselage 1 configuration shown in FIGS. 1-7. The first and second fuselages 301, 302 are arranged apart and parallel to one another such that a space 310 is formed between the first and second fuselages 301, 302. Within the space, a Busemann biplane geometry is formed by a first and second plane 321, 322 of the first fuselage 301, and a first and second plane 323, 324 of the second fuselage 302. The first plane 321 of the first fuselage 301 extends from a leading end 301a of the first fuselage 301 to a center point 304a of the first fuselage, and the second plane 322 of the first fuselage 301 extends from a trailing end 301b of the first fuselage 301 to the center point 304a. The first plane 323 of the second fuselage 302 extends from a leading end 302a of the second fuselage 302 to a center point 304b of the second fuselage 302, and the second plane 324 of the second fuselage 302 extends from a trailing end 302b of the second fuselage 302 to the center point 304b. In this embodiment, the first and second fuselages 301, 302 are arranged such that the center points 304a, 304b are aligned across from one another. In this embodiment, the first and second fuselage bodies 311, 312 have different dimensions, but are proportional to one another. In other embodiments, the first and second fuselages 301, 302 may not be proportional in dimension. The first and second fuselages 301, 302 are connected. In this embodiment, the first and second fuselages 301, 302 are connected by a first pair of stacked struts 350 extending horizontally between the first planes 321, 323 and a second pair of stacked struts 351 extending horizontally between the second planes 322, 324. The first and second pairs of stacked struts 350, 351 may have the same configuration as the pairs of stacked struts 90, 91 in the twin fuselage aircraft embodiment shown in FIGS. 16-22, or another configuration. In another embodiment, the first and second fuselages 301, 302 may be connected by a single strut or more than one single strut.

Figure 26:
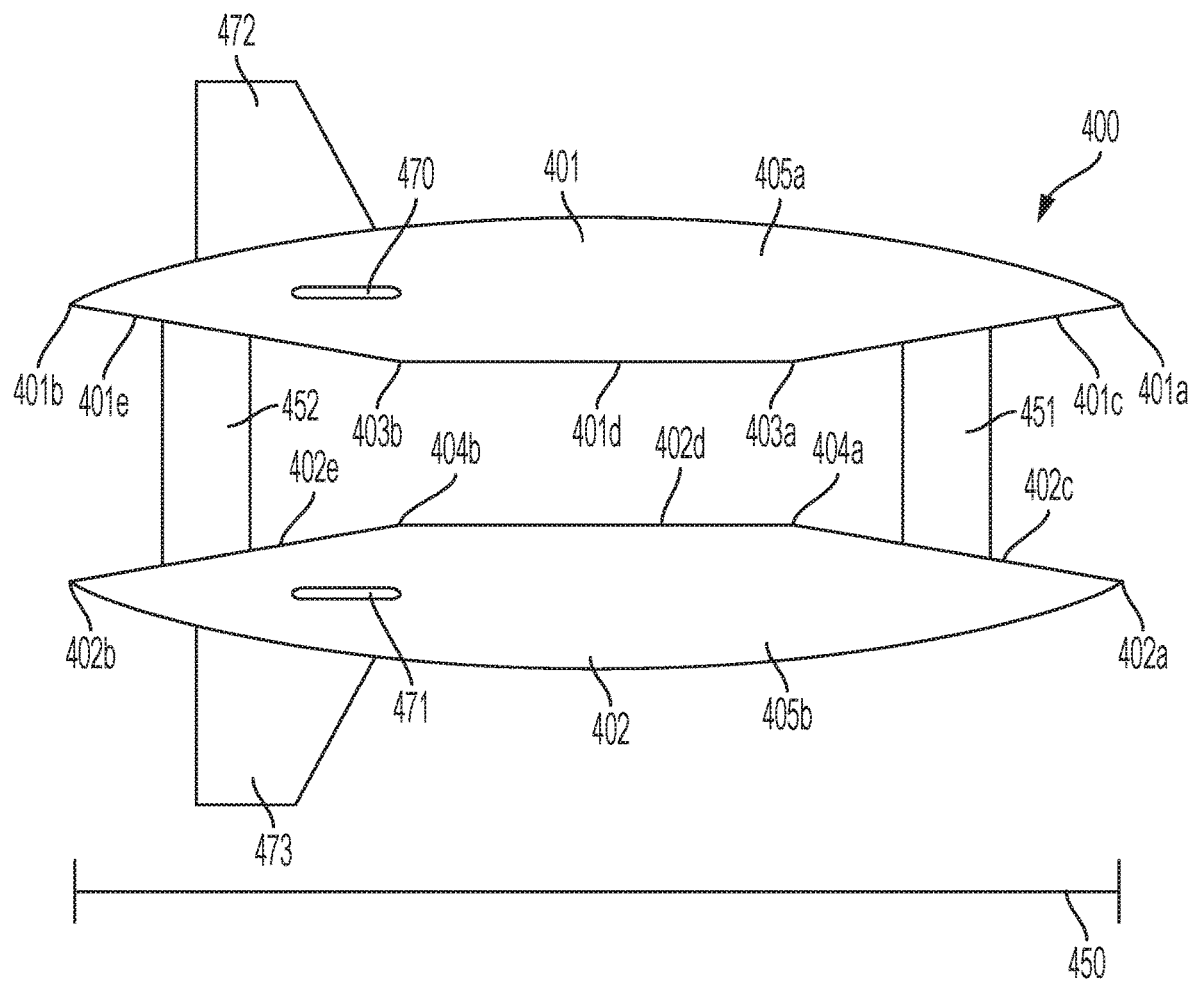
FIG. 26 depicts a top view of a supersonic aircraft having two Busemann-Sears-Haack hybrid body fuselages according to one embodiment.

Referring now to FIG. 26, a top view of an embodiment of a supersonic aircraft 400 having two Busemann-Sears-Haack hybrid body fuselages is shown. In this embodiment, the supersonic aircraft has a first fuselage 401 and a second fuselage 402. The first fuselage 401 has a first stabilizer 470 and the second fuselage 402 has a second stabilizer 471. The supersonic aircraft 400 is not limited to having two stabilizers 470, 471, and may have any number, position, and configuration of stabilizers. The supersonic aircraft 400 may have zero stabilizers. The first and second stabilizers 470, 471 are not limited to being positioned on the first and second fuselages 401, 402 and may be positioned elsewhere supersonic aircraft 400. The first and second stabilizers 401, 402 may include additional flight control components such as elevators, rudders, and the like. A first wing 472 extends from the first fuselage 401 and a second wing 473 extends from the second fuselage 401. The supersonic aircraft 400 is not limited to having two wings 472, 473 and may have one or more wings positioned along the first and second fuselages 401, 402, or another part of the supersonic aircraft 400.

The first fuselage 401 has a first fuselage body 405a and an entire length 450 extending between a first end 401a and a second end 401b of the first fuselage 401. The second fuselage 402 has a second fuselage body 405b and an entire length 450 equal to the entire length 450 of the first fuselage body 405a extending between a first end 402a and a second 402b of the second fuselage 402. In this embodiment, each of the first and second fuselages 401, 402 has three planes. The first fuselage body 405a has a first plane 401c extending from the first end 401a to a first mid-point 403a located on the first fuselage body 405a along the length 450 of the first fuselage body 405a. A second plane 401d extends between the first mid-point 403a to a second mid-point 403b located on the first fuselage body 405a along the length 450 of the first fuselage body 405a. A third plane 401e extends between the second mid-point 403b and the second end 401b. The second fuselage body 405b has a first plane 402c extending from the first end 402a to a first mid-point 404a located on the second fuselage body 405b along the length 450 of the second fuselage body 405b. A second plane 402d extends between the first mid-point 404a to a second mid-point 404b located on the second fuselage body 405b along the length 450 of the second fuselage body 405b. A third plane 402e extends between the second mid-point 404b and the second end 402b. The mid-points 403a, 403b, 404a, 404b may be referred to as plane end points. The mid-points 403a, 403b are aligned in a straight line along the first fuselage body 405a, and the midpoints 404a, 404b are aligned in a straight line along the second fuselage body 405b. The third planes 401d, 402d are parallel to one other. In application, the three planes of the first and second fuselage bodies 405a, 405b of the Busemann-Sears-Haack hybrid body fuselages 401, 402 create an additional reflection point for shockwaves. In a Busemann-Sears-Haack hybrid body fuselage aircraft with multiple fuselages, one or more fuselages may have more than two or three planes and may include additional planes arranged to provide additional reflection points for shockwaves using Busemann biplane geometries. The three-plane configuration shown in FIG. 26 may be applied to the fuselage embodiments in FIGS. 1-7 and 8-15. For example, with respect to the embodiment shown in FIGS. 1-7, the fuselage body 2 of the fuselage 1 may have a third plane similarly shaped as the first and second planes 5, 6; the third plane may be placed in between the first and second planes 5, 6. In such an embodiment, the fuselage 1 would have two midpoints instead of center point 4, and the fuselage 1 would have a circular cross section at each midpoint. The three-plane fuselage configuration may be used in an aircraft with any number of fuselages, for example, in the embodiment of the triple fuselage aircraft 200.

With continuing reference to FIG. 26, the first and second fuselages 401, 402 are connected. For example, struts, spars, or other connection structures may connect the first and second Busemann-Sears-Haack hybrid body fuselages 401, 402. In this embodiment, a first pair of stacked struts 451 extends horizontally between the first planes 401c, 402c, and a second pair of stacked struts 452 extends between the third planes 401e, 402e. In another embodiment, a third pair of stacked struts may extend between the second planes 401d, 402d. In another embodiment, a pair of stacked struts may each only extend between the first and second planes 401c, 402c; 401d, 402d. In yet another embodiment, a pair of stacked struts may only extend between the second planes 401d, 402d.

A method of making a two-fuselage aircraft such as twin fuselage aircraft 100 or two-fuselage aircraft 300 or supersonic aircraft 400 may include providing a first fuselage and a second fuselage, such as fuselage 51, 52, 301, 302, 401, 402, and connecting the first fuselage to the second fuselage such that a space is located between the first fuselage and second fuselage, wherein the first fuselage and second fuselage form a Busemann biplane geometry within the space. Connecting the first fuselage to the second fuselage may be performed by connecting at least one strut such as first or second struts 90a, 90b, 91a, 91b, 350, 351, 451, 452 to the first and second fuselages.

A method of making a triple fuselage aircraft such as triple fuselage aircraft 200 may include providing a first fuselage, a second fuselage, and a third fuselage, such as fuselage 201, 202, 203, and connecting the first fuselage to the second fuselage and connecting the second fuselage to the third fuselage. The connecting the first fuselage to the second fuselage may include connecting at least one strut such as struts of the first, second, third, and fourth pairs of struts 281, 282, 283, 284 to the first and second fuselage and the connecting the second fuselage to the third fuselage may include connecting at least one strut such as such as struts of the first, second, third, and fourth pairs of struts 281, 282, 283, 284 to the second fuselage and the third fuselage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A supersonic aircraft fuselage comprising:
   a fuselage body including
      a first end;
      a second end;
      a length extending between the first end and second end;
      a surface;
      a first flat plane extending from the first end to a center of the fuselage body along the length on the surface; and
      a second flat plane extending from the second end to the center of the fuselage body along the length on the surface,
      wherein the surface includes a curved portion conforming to a Sears-Haack body shape and abutting the first flat plane and second flat plane and extending between the first end and second end.

2. The supersonic aircraft fuselage of claim 1, wherein the supersonic aircraft fuselage has a circular cross section at the center of the length.

3. The supersonic aircraft fuselage of claim 1, wherein the first plane and the second plane are elliptical in shape.

4. The supersonic aircraft fuselage of claim 1, wherein when the supersonic aircraft fuselage is arranged with a second supersonic aircraft fuselage having a third flat plane and a fourth flat plane, the first flat plane, second flat plane, third flat plane, and fourth flat plane form a Busemann biplane geometry within a space between the supersonic aircraft fuselage and the second supersonic aircraft fuselage.

5. The supersonic aircraft fuselage of claim 1, wherein a cross section of the supersonic aircraft fuselage at the center of the length comprises a straight line and a curve connecting a first end and a second end of the straight line.

6. The supersonic aircraft fuselage of claim 1, wherein the first flat plane extends from the first end to a first plane end point on the fuselage body on the surface located along the length, wherein the second flat plane extends from the second end to a second flat plane end point on the fuselage body on the surface along the length, wherein a third flat plane extends from the first plane end point to the second plane end point, and wherein the surface includes a curved portion conforming to a Sears-Haack body and abutting the first flat plane, second flat plane, and third flat plane, and extending between the first end and second end.

7. A supersonic aircraft fuselage comprising:
   a fuselage body including:
      a first end;
      a second end;
      a length extending between the first end and second end;
      a surface;
      a first flat plane extending from the first end to a first plane end point on the first fuselage body on the surface located along the length;
      a second flat plane extending from the first plane end point to a second plane end point on the first fuselage body on the surface located along the length;
      a third flat plane extending from the second plane end point to the second end,
      wherein the surface includes a curved portion conforming to a Sears-Haack body and abutting the first flat plane, second flat plane, and third flat plane, and extending between the first end and second end.

8. The supersonic aircraft fuselage of claim 7, wherein the third flat plane is parallel to the length.

9. The supersonic aircraft fuselage of claim 7, wherein a cross section of the supersonic aircraft fuselage at the first plane end point is circular in shape, and wherein a second cross section of the supersonic aircraft at the second plane end point is circular in shape.

10. The supersonic aircraft fuselage of claim 7, wherein a first cross section of the supersonic aircraft fuselage at the first plane end point comprises a straight line and a curve connecting a first end and a second end of the straight line, and wherein a second cross section of the supersonic aircraft fuselage at the second plane end point comprises a second straight line and a second curve connecting a third end and a fourth end of the second straight line.

11. A supersonic aircraft comprising:
a first fuselage;
a second fuselage; and
a space between the first fuselage and second fuselage, wherein the first fuselage and second fuselage form a Busemann biplane geometry within the space.

12. The supersonic aircraft of claim 11, wherein the first fuselage includes a first fuselage body having a first end; a second end; a length extending between the first end and second end; a surface; a first flat plane extending from the first end to a center of the fuselage body along the length on the surface; and a second flat plane extending from the second end to the center of the fuselage body along the length on the surface, wherein the surface includes a curved portion conforming to a Sears-Haack body shape and abutting the first flat plane and second flat plane and extending between the first end and second end, wherein the first plane and second plane face the space,
wherein the second fuselage includes a second fuselage body having a third end; a fourth end; a second length extending between the third end and fourth end; a second surface; a third flat plane extending from the third end to a second center of the second fuselage body along the second length on the second surface; and a fourth flat plane extending from the fourth end to the second center of the second fuselage body along the second length on the second surface, wherein the second surface includes a second curved portion conforming to a Sears-Haack body shape and abutting the third flat plane and fourth flat plane and extending between the third end and fourth end, wherein the third plane and fourth plane face the space,
wherein the Busemann biplane geometry is formed by the first plane, second plane, third plane, and fourth plane.

13. The supersonic aircraft of claim 11, wherein a first strut extends between the first fuselage and second fuselage, and a second strut extends between the first and second fuselage parallel to and below the first strut such that a second space is formed between the first strut and second strut,
wherein the first strut includes a first strut plane facing the second space and a second strut plane facing the second space,
wherein the second strut includes a third strut plane facing the second space and a fourth strut plane facing the second space,
wherein the first strut plane, second strut plane, third strut plane, and fourth strut plane form a second Busemann biplane geometry within the second space.

14. The supersonic aircraft of claim 13, further comprising a third strut extending between the first fuselage and second fuselage and a fourth strut extends between the first fuselage and second fuselage parallel to and below the third strut such that a third space is formed between the third strut and fourth strut, wherein the third strut includes a fifth strut plane facing the fourth strut and a sixth strut plane facing the fourth strut,
wherein the fourth strut includes a seventh strut plane facing the fifth strut plane and an eighth strut plane facing the sixth strut plane,
wherein the fifth strut plane, sixth strut plane, seventh strut plane, and eighth strut plane form a third Busemann biplane geometry within the third space.

15. The supersonic aircraft of claim 11, wherein the first fuselage has a first fuselage body including
a first end;
a second end;
a length extending between the first end and second end;
a surface;
a first flat plane extending from the first end to a first plane end point on the first fuselage body on the surface located along the length;
a second flat plane extending from the first plane end point to a second plane end point on the first fuselage body on the surface located along the length;
a third flat plane extending from the second plane end point to the second end;
wherein the surface includes a curved portion conforming to a Sears-Haack body and abutting the first flat plane, second flat plane, and third flat plane, and extending between the first end and second end;
wherein the second fuselage has a second fuselage body including
a third end;
a fourth end;
a second length extending between the third end and fourth end;
a second surface;
a fourth flat plane extending from the third end to a third plane end point on the second fuselage body on the surface located along the length;
a fifth flat plane extending from the third plane end point to a fourth plane end point on the second fuselage body on the surface located along the second length;
a sixth flat plane extending from the fourth plane end point to the fourth end;
wherein the second surface includes a second curved portion conforming to a Sears-Haack body and abutting the fourth flat plane, fifth flat plane, and sixth flat plane, and extending between the third end and fourth end; and
wherein the first plane, second plane, third plane, fourth plane, fifth plane, and sixth plane form a Busemann biplane geometry within the space, and
wherein the second plane and fifth plane are parallel.

16. The supersonic aircraft of claim 11 further comprising:
a third fuselage; and
a second space between the second fuselage and third fuselage,
wherein the second fuselage and third fuselage form a second Busemann biplane geometry within the second space.

17. The supersonic aircraft of claim 16, wherein the second fuselage includes a second fuselage body comprising
a first end;
a second end;
a length extending between the first end and second end;
a surface;

a first flat plane extending from the first end to a center of the second fuselage body along the length on the surface;

a second flat plane extending from the second end to the center of the second fuselage body along the length on the surface, a third flat plane opposite the first flat plane, the third flat plane extending from the first end to a second center of the second fuselage body opposite the center along the length on the surface, a fourth flat plane opposite the second flat plane, the fourth flat plane extending from the second end to the second center of the second fuselage body along the length on the surface, wherein the first flat plane and second flat plane face the first fuselage, and the third flat plane and fourth flat plane face the second fuselage, wherein the surface includes a curved portion conforming to a Sears-Haack body shape and abutting the first flat plane, second flat plane, third flat plane, and fourth flat plane, and wherein the curved portion extends between the first end and second end.

18. A method of making a supersonic aircraft comprising:
providing a first fuselage and a second fuselage; and
connecting the first fuselage to the second fuselage such that a space is located between the first fuselage and second fuselage,
wherein the first fuselage and second fuselage form a Busemann biplane geometry within the space.

19. The method of making a supersonic aircraft of claim 18, wherein the connecting the first fuselage to the second fuselage includes connecting at least one strut to the first and second fuselages.

20. The method of making a supersonic aircraft of claim 18 further comprising: providing a third fuselage; and
connecting the second fuselage to the third fuselage such that a second space is located between the second fuselage and third fuselage,
wherein the second fuselage and third fuselage form a Busemann biplane geometry within the second space.

21. The method of making a supersonic aircraft of claim 20, wherein the connecting the first fuselage to the second fuselage includes connecting at least one strut to the first and second fuselage, and wherein the connecting the second fuselage to the third fuselage includes connecting at least one strut to the second fuselage and the third fuselage.

* * * * *